United States Patent [19]

Squires et al.

[11] Patent Number: 5,610,808
[45] Date of Patent: Mar. 11, 1997

[54] HARD DISK DRIVE CONTROLLER EMPLOYING A PLURALITY OF MICROPROCESSORS

[75] Inventors: John P. Squires, Boulder; Charles M. Sander; Stanton M. Keeler, both of Longmont; Donald W. Clay, Louisville, all of Colo.

[73] Assignee: Conner Peripherals, Inc., San Jose, Calif.

[21] Appl. No.: 315,129

[22] Filed: Sep. 29, 1994

Related U.S. Application Data

[60] Continuation of Ser. No. 997,898, Dec. 29, 1992, Pat. No. 5,412,666, which is a division of Ser. No. 611,141, Nov. 9, 1990, abandoned.

[51] Int. Cl.$^6$ .................................................. G05B 15/02
[52] U.S. Cl. .................... 364/131; 364/138; 360/78.12
[58] Field of Search .................................. 364/131, 133, 364/138; 395/325, 725, 275, 438, 821; 360/69, 71, 97.01, 98.01; 371/10.1

[56] References Cited

U.S. PATENT DOCUMENTS

| | | | |
|---|---|---|---|
| 4,420,819 | 12/1983 | Price et al. | 364/466 |
| 4,773,004 | 9/1988 | Gershenson et al. | 364/200 |
| 5,034,914 | 7/1991 | Osterlund | 364/900 |
| 5,155,845 | 10/1992 | Beal et al. | 395/575 |
| 5,191,584 | 3/1993 | Anderson | 371/51.1 |
| 5,214,768 | 5/1993 | Martin et al. | 395/425 |
| 5,261,058 | 11/1993 | Squires et al. | 395/275 |
| 5,274,773 | 12/1993 | Squires et al. | 395/275 |
| 5,341,387 | 8/1994 | Nguyen | 371/45 |

Primary Examiner—Paul P. Gordon
Attorney, Agent, or Firm—Fliesler, Dubb, Meyer & Lovejoy

[57] ABSTRACT

A controller in a hard disk drive system for controlling the transfer of data and control signals between a plurality of host processors and the disk drive system. The disk drive system including storage media, at least one transducer for recording data on and retrieving data from the storage media and an actuator for moving the transducers with respect to the storage media. The controller includes a programmed first microprocessor operating under control of a first operating system stored in a first memory unit associated with the first microprocessor for controlling the recording of data on and the retrieval of data from the storage media, the controlling of the actuator to locate the transducer at and to maintain the transducer at a specified location with respect to the storage media. The controller includes a programmed second microprocessor operating under control of a second operating system stored in a second memory unit associated with the second microprocessor for controlling the transfer of data from a requesting host processor to the disk drive system and the transfer of data recovered from the storage media to a requesting host processor and for generating and communicating parameters to the first microprocessor for defining operations to be performed by the first microprocessor. The second microprocessor operates independently of and concurrently with the first microprocessor and the first microprocessor operates independently of and concurrently with the second microprocessor in exercising operations defined by the parameters received from the second microprocessor.

16 Claims, 8 Drawing Sheets

HARD DISK DRIVE CONTROLLER EMPLOYING A PLURALITY OF MICROPROCESSORS

CROSS-REFERENCE TO RELATED APPLICATION

This application is a continuation of Ser. No. 07/997,898, filed Dec. 29, 1992, now U.S. Pat. No. 5,412,666 issued May 2, 1995, which is a divisional of Ser. No. 07/611,141, filed Nov. 9, 1990, now abandoned as of Mar. 5, 1993.

DISK DRIVE SYSTEM CONTROLLER ARCHITECTURE, Ser. No. 07/057,289, filed Jun. 2, 1987, assigned to the assignee of the present application and now U.S. Pat. No. 4,979,056 issued Dec.. 18, 1990;

DISK DRIVE SOFTWARE SYSTEM ARCHITECTURE, Ser. No. 07/057,806, filed Jun. 2, 1987, assigned to the assignee of the present application now abandoned (Feb. 23, 1990);

LOW-POWER, HARD DISK DRIVE SYSTEM ARCHITECTURE, Ser. No. 07/152,069, filed Feb. 4, 1987, assigned to the assignee of the present application now abandoned (Aug. 7, 1990);

DISK DRIVE SYSTEM USING MULTIPLE EMBEDDED QUADRATURE SERVO FIELDS, Ser. No. 07/386,504, filed Jul. 27, 1989, assigned to the assignee of the present application now abandoned (Oct. 17, 1991);

ADAPTIVE READ EQUALIZER WITH SHUTOFF MODE FOR DISK DRIVES, Ser. No. 7/559,899, filed Jul. 30, 1990, assigned to the assignee of the present application now abandoned (Sep. 30, 1992);

DISK DRIVE SYSTEM EMPLOYING ADAPTIVE READ/WRITE CHANNEL CONTROLS AND METHOD OF USING SAME, Ser. No. 7/420,371, filed Oct. 12, 1989, assigned to the assignee of the present application now abanoned (Oct. 28, 1991);

MULTIPLE ACTUATOR DISK DRIVE, Ser. No. 07/431,575, filed Nov. 3, 1989, assigned to the assignee of the present application now U.S. Pat. No. 5,223,993 issued Jun. 29, 1993;

HIGH PERFORMANCE DISK DRIVE ARCHITECTURE, Ser. No. 07/612,427, filed Nov. 9, 1990, assigned to the assignee of the present application now abandoned (Jun. 15, 1993); and MULTIPLE ACTUATOR DISK DRIVE, Ser. No. 7/614,853, filed Nov. 9, 1990, assigned to the assignee of the present application now U.S. Pat. No. 5,293,282, issued Mar. 8, 1993.

Each of these Related Applications is hereby incorporated by reference.

FIELD OF THE INVENTION

The present invention is generally related to hard disk drives and disk drive electronic control systems. In particular, the present invention relates to a high performance, multiprocessor electronic control system for controlling actuator with respect to a the disks stack of a hard disk drive.

BACKGROUND OF THE INVENTION

The development of disk drive systems is continuing at a substantial pace as market requirements continue to evolve. Disk drives are finding application in a wide variety of systems ranging from full function notebook style computers to high-performance, single-user, multitasking workstations and further to broadly generalized, high-performance, multi-user computer systems. Although the disk drive design requirements for use in such a diverse universe of applications would appear to be substantial and varied, there are a number of common requirements. These requirements include high-reliability, low power consumption, high data access and transfer speeds and minimum form-factor size and weight for the storage capacity provided.

For workstations and high-performance, generalized computer systems, the requirements on disk drive designs tend to accentuate the need for high-capacity and substantial data access and transfer rates. In addition, there is a desire to have flexibility in the specific control implementation of such high performance drives that can be tailored or enhanced to slightly or possibly even significantly improved the performance of the drive depending in the actual circumstances of the application.

Prior high-performance disk drive systems have typically relied on substantial mechanical performance enhancements to boost data access speed. Such improvements have included providing multiple data read/write heads per disk surface. In some embodiments the multiple heads have been carried on a common actuator arm, thereby reducing the length of a data seek stroke to arrive at a desired track location. Alternately, multiple actuator assemblies have been utilized to allow independent data seeks to occur simultaneously.

While these are the mechanical achievements the conventional approach to enhancing data transfer rate, from the point of view of the control electronics has been to employ specific, dedicated electronic subsystems to manage the independent specific function necessary to operate the drive system. While generally capable of obtaining the high data transfer rates desired, such a design necessarily freezes the architecture of the drive control system. Changes in the specific nature of the mechanical or high-level drive control operation requires at least a corresponding alteration to the underlying electronic hardware architecture, if not a complete redesign. Further, the cost associated with the development of the initial dedicated electronic subsystems as well as to implement any subsequent design modifications results in a substantial tine and cost investment.

SUMMARY OF THE INVENTION

Therefore, a general purpose of the present invention is to provide a disk drive system and electronic control architecture that is capable of achieving high access and data transfer speeds while maintaining high reliability and low cost.

This is achieved in the present invention by providing an electronic disk drive architecture for controlling the transfer of data between a host processor interface and a recording media that includes one or more disk surfaces for storing data, a memory buffer, a host interface, a low-level data controller for controlling the transfer of data between the disks and the data buffer, an interface controller for controlling the transfer of data between the host interface and the data buffer, and an arbiter and buffer controller responsive to data transfer requests from the low-level and interface controllers, for arbitrating data storage and retrieval accesses with respect to the data buffer. The low-level and interface controllers operate substantially independent of one another in performing their respective control operations. Consequently, data is transferred bi-directionally through the data buffer at the optimum timing for both controllers.

Thus, an advantage of the present invention is that effective use is made of both the interface and low-level controllers of the present invention, thereby maximizing data throughput through the electronic control architecture and drive system.

Another advantage of the present invention is that both the interface and low-level controllers include high performance, general purpose micro-controllers for performing substantial portions of the respective controller functions through the execution of firmware control programs. The remaining portions of the control architecture are implemented utilizing a limited number of dedicated control circuits. However, such circuits are designed for direct or programmed control by the microcontrollers to maximize flexibility of operation.

A further advantage of the present invention is that the electronic control architecture is scalable through the addition of additional low-level controllers for handling respective actuators units. Consequently, the data access times may be substantially reduced while correspondingly increasing the data transfer rates achievable by hard disk control systems constructed in accordance with the present invention.

Still another advantage of the present invention is that the operation of the electronic control architecture of the present invention may be substantially modified through changes in the firmware stored control programs and, therefore, without alteration of the electronic hardware architecture.

A still further advantage of the present invention is that it provides programmable hardware support for minimizing the latency of data transfers through the host interface when using an integrated drive electronics (IDE) host interface.

Yet still another advantage of the present invention is that it maintains low cost and high flexibility and reliability through the use of a minimum number of dedicated control components and an optimum number of general purpose of microcontrollers for the desired level of data transfer and access rates.

BRIEF DESCRIPTION OF THE DRAWINGS

These and other advantages and features of the present invention will become better understood when considered in conjunction with the accompanying drawings, wherein like reference numerals designate like parts throughout the figures thereof, and wherein:

FIG. 7b is a detailed block diagram of the programmable burst transfer control logic utilized by the interface support circuit shown in FIG. 7a.

DETAILED DESCRIPTION OF THE INVENTION

A. Overview: Multi-Actuator Control System

Figure 1:
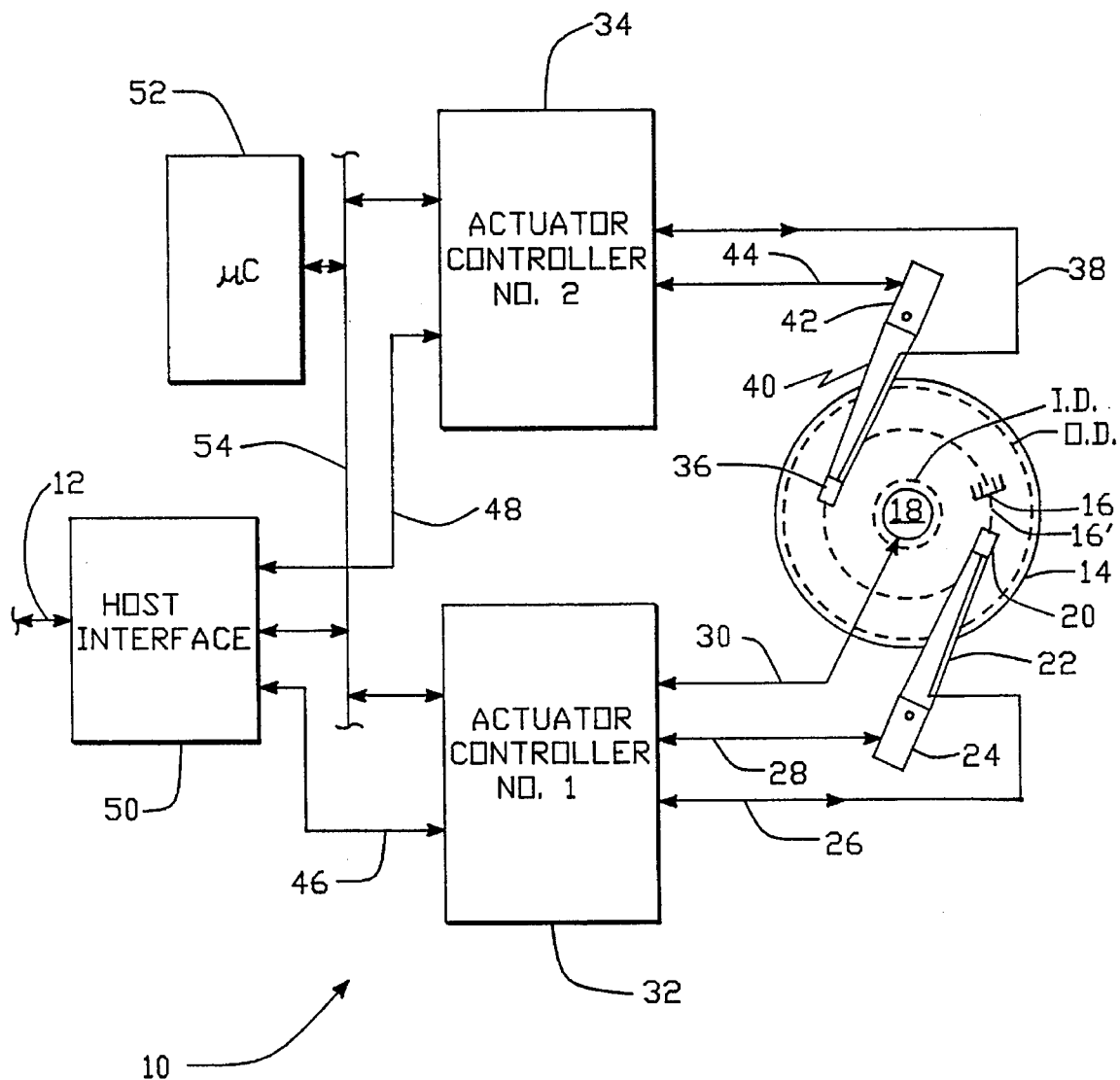
FIG. 1 is a block diagram of an exemplary multi-actuator control system demonstrating the architecture of a preferred embodiment of the present invention.

A multiple microcontroller hard disk drive control architecture, generally indicated by a reference numeral 10, is shown in FIG. 1. The control architecture 10 ultimately provides for the transfer of data between a host computer coupled to a host interface 12 and a magnetic recording surface of a disk 14. In the exemplary embodiment shown, a read/write head 20 is positioned over a selected track 16' of the concentric tracks 16 within a track band defined by inner diameter (ID) and outer diameter (OD) tracks. The disk 14 is spun by a spin motor 18.

The head 20 is supported on a flexure arm 22 that is, in turn, coupled to a voice coiled motor driven actuator 24. Additional disks 14 and head/arm assemblies 20, 22 may be ganged on the spin motor 18 and actuator 24, respectively. An actuator controller 32 sends and receives serialized data with respect to the head 20 via line 26. Control lines 28 are driven by the actuator controller 32 to control the actuator motor 24 and, thereby, the position of the head 20 with respect to a selected track 16'. The actuator controller 32 further generates the commutation control signals, via control line 30, necessary to operate the spin motor 18. The preferred methods and circuits for controlling the spin motor 18 are as described in U.S. Pat. No. 4,876,491, Squires et al., issued Oct. 24, 1989.

A second actuator controller 34, substantially identical to the first actuator controller 32, is provided to control the positioning of a head 36 mounted on a second flexure arm 40 and connected to a second a voice coil motor driven actuator arm 42. A line 38 allows the transfer of serialized data between the head 36 and the actuator controller 34. Similarly, actuator control signals are provided via the lines 44 from the actuator controller 34 to the voice coil motor of the actuator arm 42. Since the first actuator controller 32 controls the spin motor 18, this function is not implemented or, alternately, left unconnected in the second actuator controller 34.

Operation of the second actuator controller 34 is substantially independent of the first actuator controller 32. Thus, positioning of the head 35 may be with respect to any selected track 16 on the magnetic recording surface of the disk 14 including the same track 16' over which the head 20 is positioned.

Data and control signals are transferred by the actuator controllers 32, 34 via independent data and control buses 46, 48 to a host interface unit 50. In accordance with the preferred embodiments of the present invention, the host interface unit 50 is responsible for communications with the host to exchange control requests and data requests via the interface 12 and routing a corresponding series of one or more control requests and data, as necessary to fulfill the control and data requests, to one or both of the actuator controllers 32, 34 as appropriate to retrieve or store data with respect to the disk 14.

The actuator controllers 32, 34 incorporate independent shared memories for the buffering of disk data held in transit between the host interface 50 and the disk 14. The data, as queued in the shared memories, may be monitored and manipulated, if necessary, by the microcontroller 52 prior to being accepted for transfer from the actuator controllers 32, 34 to the host interface unit 50. For this purpose, and to allow the microcontroller 52 to programmatically control the dynamic function of the actuator controllers 32, 34 and host interface unit 50, a data, address and control bus 54 is provided. The bus 54 allows memory add I/O mapped access to control and status registers within the actuator controllers 32, 34 and the host interface unit 50 independent of the control and data buses 46, 48.

The actuator controllers 32, 34 are each responsible for arbitrating access between the host interface unit 50, microcontroller 52 and the respective disk data channels represented by serial data lines 26, 38 for the transfer of data through the shared memories of the actuator controllers 32, 34. The control and data path architecture thus provided substantially isolates the low level disk control functions, including control over the seek and track-following positioning of the heads and the read/write transfer of data between the disk 14 and the shared memories, from the high level functions performed by the microcontroller 52, including support of the host interface command decoding and management and the transfer of data between the interface 12 and the shared memories of the actuator controllers 32, 34. Consequently, interaction between the host and low-level aspects of the system 10 is substantially limited to the arbitrated interleaving of accesses to the shared memories; the microcontroller 52 and actuator controllers 32, 34 operate continuously in support of their respective functions.

B. Interface and Single/Multiple Actuator Controller System Architecture

Figure 2:
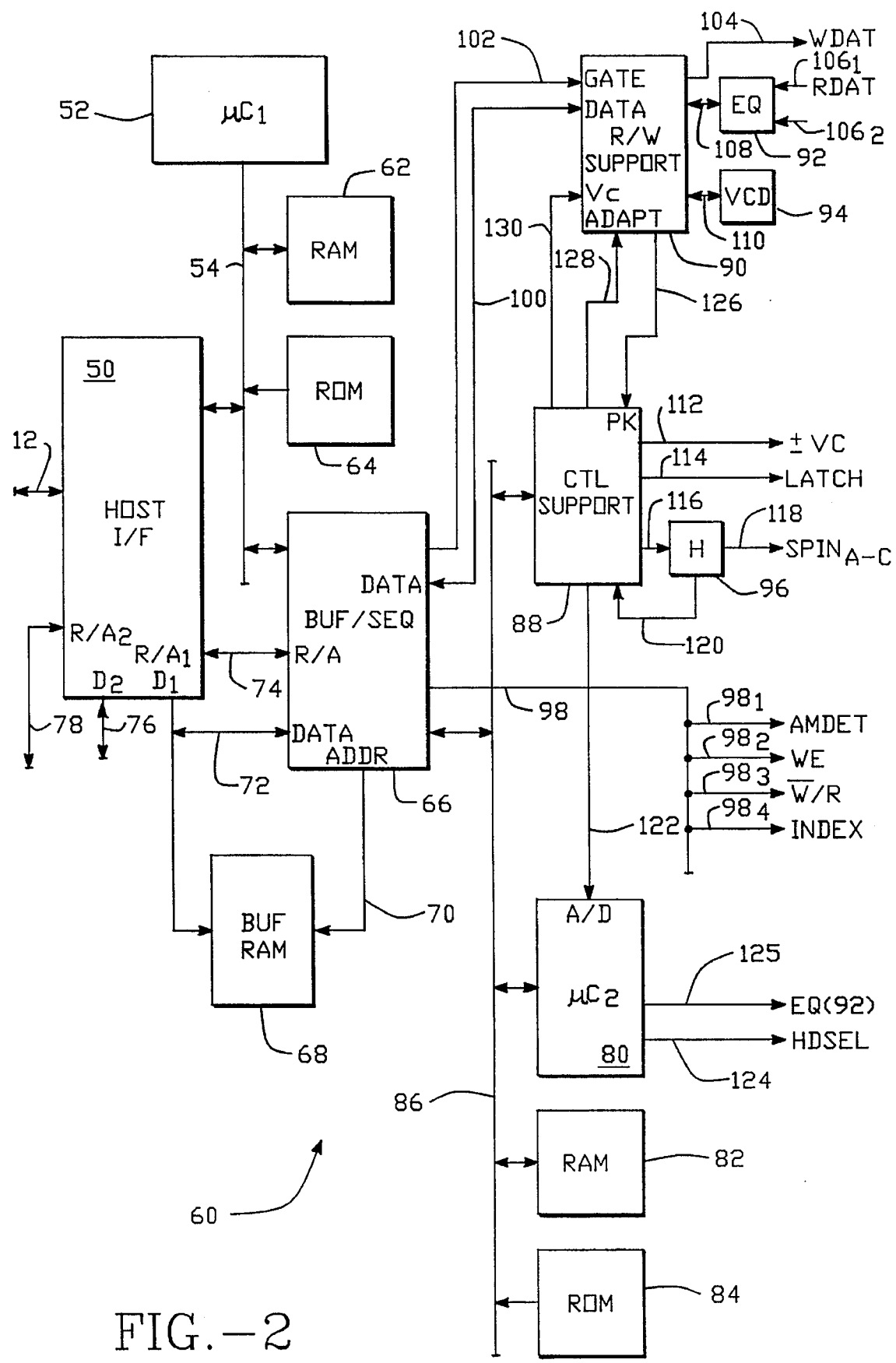
FIG. 2 is a block diagram of the host interface and secondary level control portion of a disk drive control architecture constructed in accordance with a preferred embodiment of the present invention.

A detailed block diagram of a control system implementing the interface and a single actuator controller, together generally indicated by the reference numeral 60, is shown in FIG. 2. The interface controller level includes the host interface unit 50 and the microcontroller 52. In the preferred embodiment of the present invention, the microcontroller 52 is a Motorola 68HC11 single chip microprocessor operating at a system clock rate of four megahertz (4 MHz). The 68HC11 is described in the Motorola data book ADI1207, available from Motorola Semiconductor, Inc., Motorola Literature Division, P.O. Box 20912, Phoenix, Ariz. 85036. Also, included is a random access memory (RAM) unit 62 and a read only memory (ROM) unit 64. The ROM unit 64 is used to store a control program executed by the microcontroller 52. The RAM, ROM, and host interface units 62, 64, 50 are accessible via the main address, control and data bus 54 of the microcontroller 52.

The remaining elements shown in FIG. 2 make up a single actuator controller of the present invention. This actuator controller includes a buffer/sequencer unit 66 and a shared memory implemented by a buffer RAM memory 68. Buffer/sequencer unit 66 uniquely generates and provides, via bus 70, the addresses utilized to access the buffer memory 68. A shared data bus 72 allows data transfers between the host interface unit 50 and the buffer memory 68 and, separately, between the buffer/sequencer 66 and the buffer RAM 68. Access by the host interface unit 50 to the buffer RAM 68 is arbitrated and managed by the buffer/sequencer 66 though an exchange of request and acknowledge control signals passed via lines 74.

The buffer/sequencer 66 also implements a page mode access data path for the microcontroller 52 to access and modify the contents of the buffer RAM 68. This is accomplished by an internal data path connecting the data bus portion of the address, control and data bus 54 to the data lines 72 and a page mode address generation control logic unit.

A second microcontrol let 80 is provided to control the overall operation of the actuator controller. Again, the microcontroller 80 is preferably a 4 MHz Motorola 68HC11 microprocessor. The microcontroller 80 is coupled via a main data address and control bus 86 to a RAM unit 82 and a ROM unit 84. The ROM unit 84 provides for storage of a control program executed by the microcontroller 80 to implement the low-level control functions of track-following control of a head 20 with respect to a track 16', seek control of the head 20 between any selected tracks 16, read/write transfer of data between a surface of the disk 14 and, through the buffer/sequencer 66, to the buffer memory 68 and, finally, spin-up and speed control of the spin motor 18.

The buffer/sequencer 66, in support of the microcontroller 80, preferably includes the disk data and servo sequencer control logic. These sequencers are preferable programmed and managed through control registers that are accessible to the microcontroller 80 via the data address and control bus 86. A read/write support circuit 30 is also provided to implement the generally analog signal processing functions necessary to produce serialized data on a line 104 (WDAT) and to receive a differential raw read data signal from the input lines $106_{1,2}$. An equalizer circuit 92, constructed and operated as disclosed in the above-identified U.S. patent application "Adaptive Read Equalizer with Shut-Off Mode for Disk Drives", is connected via lines 108 to the read/write support circuit 90. A voltage controlled oscillator (VCO) 94, coupled to the read/write support unit 90 via lines 110, is used in regenerating the data clock from the raw data received via lines 108. The raw data, the data clock and the clock separated NRZ data are returned to the buffer/sequencer via lines 100.

A control support unit 88 is also coupled to the address, data and control bus 86 to provide basic hardware support for the microcontroller 80 in performing the actuator seek, track-following and spin motor control functions. Specifically, the control support unit 88 implements a digital-to-analog converter (DAC) and power driver for generating a differential control signal (±VC) that is used to drive the voice coil motor of the actuator 24. The input to the digital-to-analog converter is a programmable data register that is writable by the microcontroller 80 via the data address and control bus 86. In similar manner, control registers writable via the address, data and control bus 86 provide a programmable internal interface within the control support unit 88 that establishes the state of control signals provided on line 114 to enable and disable the actuator arm latch, on lines 112 to establish an actuator commutation state, on lines 128 to establish an adaptive control profile state of the read/write support circuit 90, and on line 130 to indirectly provide power to the read/write support circuit 90.

In the preferred single chip embodiment of the control support unit 88, sufficient drive current to directly drive the spin motor 18 cannot be sourced through the control support unit 18. Therefore, the commutation control signals provided on lines 116 are used to control an H-bridge configured power FET circuit 96 that, in turn, yields the direct three-phase commutation control signals on lines 118 ($Spin_{A-C}$). A current return path from the H-bridge circuit 96 is provided via line 120 to the control support unit 88. This feedback currented is converted to a voltage level and provided via one of lines 122 to a respective analog-to-digital converter input of the microcontroller 80.

The servo sequencing portion of the buffer/sequencer 66, implementing an embedded servo control subsystem in the preferred embodiments of the present invention, is responsive to the raw data returned by the read/write support circuit 90 to the buffer/sequencer 66 via one of the data lines 100. In response, the internal servo sequencer logic of the buffer/sequencer 66 generates a number of servo control signals $98_{1-4}$, for synchronizing and managing the operation of the actuator controller with respect to control information received from the disk 14. The internal servo sequencer further generates a sequence of servo burst gate signals that are provided via lines 102 to the read/write support circuit 90. These servo burst gate signals are utilized to gate respective servo bursts, timed from the occurrence of an address mark detected signal, also provided on line $98_1$, onto respective peak signal lines 126. The control support unit 88 generally includes sample-and-hold circuits for each of the peak signals received via lines 126. The outputs of the peak sample-and-hold circuits are provided on respective ones of the lines 122 to corresponding analog-to-digital inputs of the microcontroller 80. In this manner, the microcontroller 80 is capable of acquiring and determining the relative off-track position of the head 20 with respect to a desired current track 16'. To compensate for an off-track condition or to modify the actuator acceleration profile in a seek operation, the microcontroller 80 calculates an appropriate actuator position correction digital value that is, in turn, written to the voice coil motor position change control register within the control support unit 88.

Finally, the microcontroller 80 operates to directly select the specific read/write head 20 that is to used to read or write data, where respective heads are provided for reading and writing data to a plurality of disk surfaces. Specifically, the head select lines 124 are connected to a conventional head data multiplexer and preamplifier circuit (not shown) for selectively enabling an electrical data channel to a corresponding one of the read/write heads 20. Other functions, such as enabling of the equalizer circuit 92 via control line 125, are also directly performed by the microcontroller 80.

The interface and actuator controllers together indicated by the reference numeral 60 implement a complete control and data path between the host interface 12 and the disk 14 through a single actuator assembly 20, 22, 24. The architecture of the present invention, however, readily admits of modular expansion to allow multiple actuator assemblies, such as the assembly 36, 40, 42 to be included within the overall architecture without any significant architectural change. Specifically, the preferred embodiment of the host interface unit 50 is provided with a second low-level controller shared data bus 76 and request/acknowledge lines 78. Duplication of the actuator controller 32 to generally include a buffer/sequencer 66', buffer memory 68', microcontroller 80', RAM 82', ROM 84', control support unit 88' and read/write support unit 90', mutually interconnected in an essentially identical manner as in the actuator controller 32, coupled to the host interface unit via the shared data bus 76, request/acknowledgment lines 78 and to the data, address, and control bus 54 provides for full function, independent control of the second actuator assembly 36, 40, 42. Again, the one notable difference is that such a second actuator controller 34 need not provide for control of the spin motor 18 or, if at all, only in a redundant or back up mode.

1 Buffer/Sequencer and R/W Support Circuit

Figure 3:
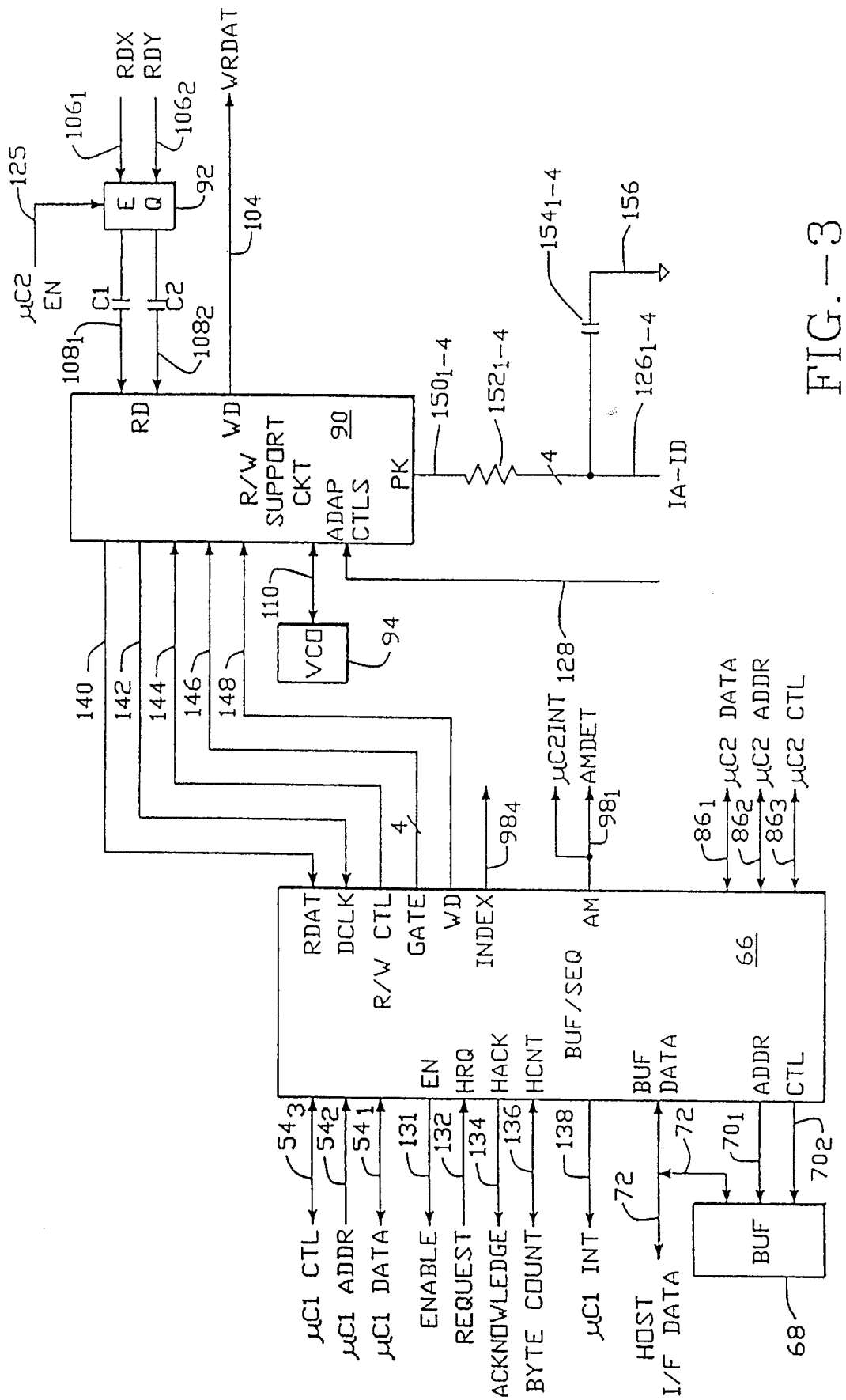
FIG. 3 is block diagram detailing the buffer sequencer and data transfer support circuits of the present invention.

Referring now to FIG. 3, the buffer/sequencer 66 and read/write support circuit 90 are shown in greater detail. As shown, the buffer/sequencer 66 appears as a memory mapped peripheral device on the data address and control bus $54_{1-3}$ with respect to the interface microprocessor 52. The request/acknowledge lines 74 preferably include separate enable, request, acknowledge and byte count signal lines 131, 132, 134, 136. The host interface unit 50 may provide a data transfer request via line 132. Upon successful arbitration, the buffer/sequencer 66 provides an acknowledge signal via 134. The byte count lines 136 encode take number of bytes to transferred with each request/acknowledgment cycle. In order to enhance the data access and transfer efficiency to the buffer 68, write burst sequences of 1 to 4 bytes are transferred to the buffer 68 with each request/acknowledge cycle. Preferably, where the buffer memory is constructed from static RAM, single byte transfers are selected. When page mode dynamic RAM is used, conventional page access addressing enables one to four bytes to be transferred in rapid sequence. Finally, the enable signal is provided by the buffer/sequencer 66 where data is to be transferred by the host interface unit 50 to the buffer memory 68. The direction of the transfer will have been preprogrammed by the host microcontroller 52 for both the host interface unit 50 and the buffer/sequencer 66. The enable signal on line 131 is used to enable the shared data bus driver circuitry of the host interface in anticipation of the acknowledge/data transfer cycle. The enable signal is naturally not used where the source of data is the buffer memory 68; the data driver circuitry of the buffer 68 is enabled by a signal on the control lines $70_2$. Thus, all data transferred to the buffer 68 is by way of the shared data bus 72. The buffer/sequencer 66 incorporates an address generation unit and the buffer control circuitry necessary to drive the address lines $70_1$ and memory access control lines $70_2$.

A line 138 is provided to an interrupt input of the microprocessor 52. The buffer/sequencer 66 provides an interrupt signal on line 138 whenever the microprocessor 80 utilizes the data, address and control bus $86_{1-3}$ to transfer an interprocessor command and accompanying data to the microprocessor 52. Specifically, the interprocessor command and data registers are used by the microcontroller 52 to pass commands to the microcontroller 80 to select the next operation to be performed. Thus, commands received through the host interface 12 are transferred to the local RAM memory 62 for decomposition by the microcontroller 52 into corresponding sequences of low-level commands that can be sequentially executed by an actuator controller 32, 34. Table I and II detail the preferred interprocessor communication register set.

TABLE I

| μC1 Local Communications Registers | | | |
|---|---|---|---|
| Register | Size | Dir. | Function |
| Status | 8 bit | Read | Command and μC2 data valid status bits |
| μC1 Command | 8 bit | Write | Command value written by μC1 |
| μC2 Command | 8 bit | Read | Command value written by μC2 |
| μC1 Data | 16 bit | Write | Data value written by μC1 |
| μC2 Data | 16 bit | Read | Data value written by μC2 |

TABLE II

| \multicolumn{4}{c}{μC2 Local Communications Registers} | | | |
|---|---|---|---|
| Register | Size | Dir. | Function |
| Status | 8 bit | Read | Command and μC1 data valid status bits |
| μC1 Command | 8 bit | Read | Command value written by μC1 |
| μC2 Command | 8 bit | Write | Command value written by μC2 |
| μC1 Data | 16 bit | Read | Data value written by μC1 |
| μC2 Data | 16 bit | Write | Data value written by μC2 |

The buffer/sequencer 66 further implements the disk data and servo sequencers necessary for the controlled transfer of data to and from the disk 14. Preferably, a split sector, quad-servo burst, embedded servo control system is utilized whereby sector header information is continually read from the disk via a currently selected head 20 to enable track-following by the head 20. The differential raw read data is provided via lines $106_{1-2}$ through an equalizer 92 and DC blocking capacitors $C_1$ and $C_2$ to the read/write support circuit 90 via lines $108_{1-2}$. A single ended difference signal based on the differential raw data signal is provided as the raw data signal (RDAT) to the buffer/sequencer 66 via line 140. The read/write support circuit 90 also isolates the data clock from the raw data stream and provides the corresponding clock signal via line 142 to the buffer/sequencer 66. From these signals, the buffer/sequencer 66 is able, through its internal servo sequencer logic, to detect the occurrence of an address mark in the data stream. The address mark signals the beginning of a sector header. A corresponding address mark signal is provided via line $98_1$ as an address mark detect signal and as an interrupt signal to the microcontroller 80. This interrupt signal is utilized to synchronize the execution of firmware program by the microcontroller 80 to the specific rotational position of the disk 14.

In accordance with the preferred embodiments of the present invention, a series of four servo burst gate signals are provided via lines 146 to the read/write support circuit 90 to gate respective portions of the raw data signal obtained from a sector/header onto peak lines $150_{1-4}$. These gating signals are intended to isolate the quadrature servo burst pattern utilized in the preferred embodiments of the present invention. The manner of using a quadrature burst servo pattern, consistent with the use in the present invention, is described in the above-identified U.S. patent application "Disk Drive System Using Multiple Embedded Quadrature Servo Fields". Resistors $152_{1-4}$ and capacitors $154_{1-4}$ implement four parallel peak signal detector circuits. The detected peak signals are then provided on lines $126_{1-4}$ (IA–ID).

The servo sequencer logic of the buffer/sequencer 66 further provides a read/write control signal via line 144 to the read/write support circuit 90 to select reading or writing of the sector data fields as generally determined by the disk data sequencer logic within the buffer/sequencer 66, though ultimately under the direction of the microcontroller 80. Sector headers are always read in support of the embedded servo track-following function. Where data is to be transferred by the data sequencer logic to the sector data fields on the disk 14, digital serialized data is provided on the write data line 148 to the read/write support circuit 90. This data is subsequently provided on the write data line 104 to the head multiplexer and preamplifier circuit (not shown) for conversion into an analog signal suitable for recording on the surface of the disk 14.

Finally, the servo sequencer within the buffer/sequencer 66 further provides for the reading of the sector ID numbers from the servo sector headers. Upon reading the zero servo sector ID, an index signal is generated and provided via line $98_4$.

2. Control-Support Circuit

Figure 4:
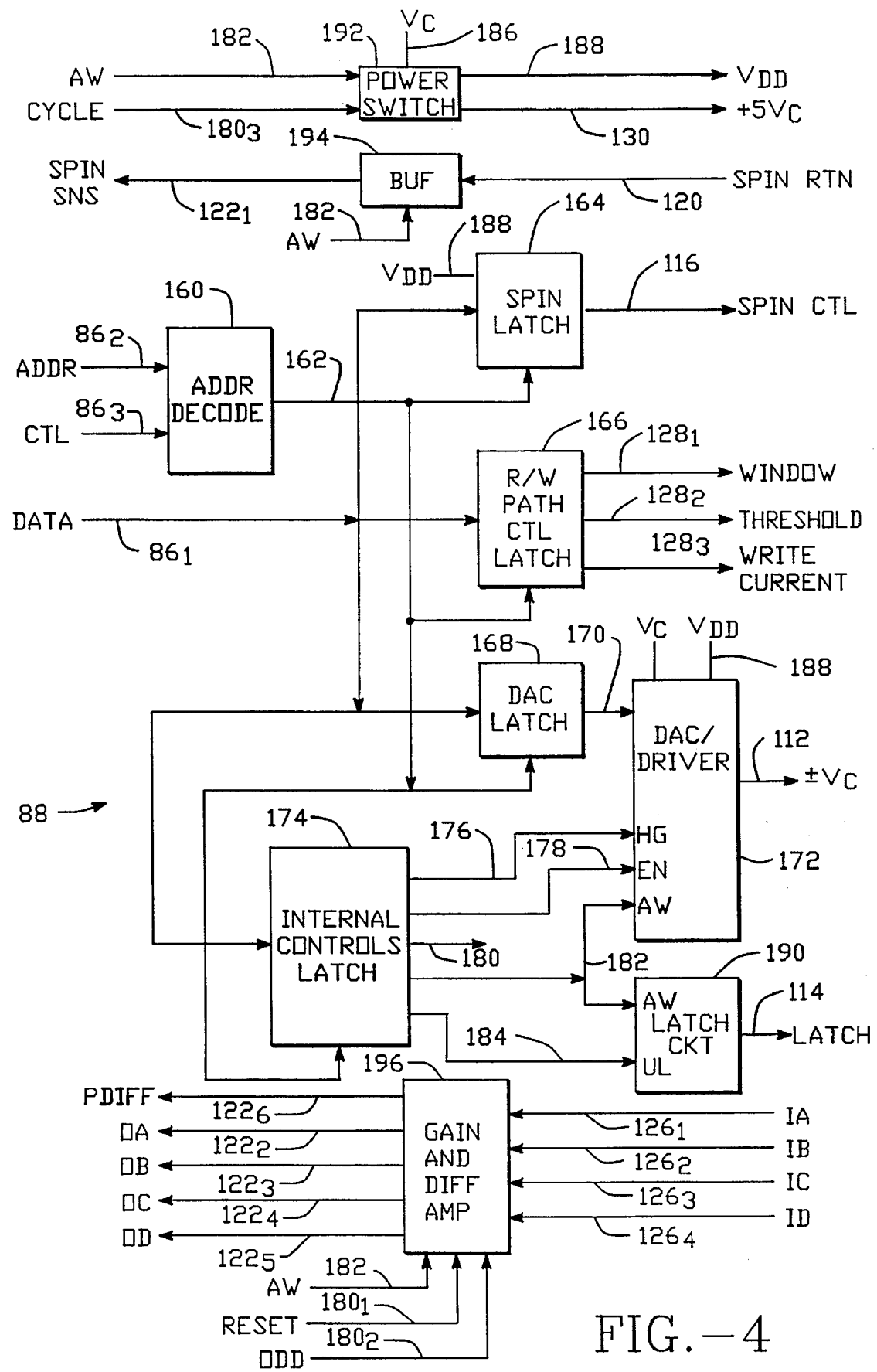
FIG. 4 is a detailed block diagram of the control supports circuit constructed in accordance with the preferred embodiment of the present invention.

An internal block diagram of the control support circuit 88 is shown in FIG. 4. An address decode unit 160 receives the address and control buses $86_{2-3}$ and, in turn, provides individually selected enable signals via respective ones of the lines 162 to a spin latch 164, read/write path control latch 166, digital-to-analog converter (DAC) latch 168, and an internal control latch 174. The data bus $86_1$ permits the low-level microcontroller 80 to write a commutation state defining digital word into the spin latch 164. The corresponding state control signals are then provided on the output lines 116.

The read/write path control latch 166 receives a data word from the data bus 86, that digitally defines adjustments to the read data timing window, read signal discrimination threshold and write-current levels as used by the read/write support circuit 90. The digital outputs of the read/write path control latch 166, as provided via lines $128_{1-3}$, provides three multiple-bit binary encoded values that, upon passage through resistor weighing circuits (not shown) provide analog signal values that are proportional to the changes in the desired timing window delay, read threshold potential and write current level that are to be used by the read/write support circuit 90. The preferred manner of using these adaptive read/write channel controls is set forth in the above-identified U.S. patent application "Digital Drive system Employing Adaptive Read/Write Channel Controls and Methods of Using Same".

The DAC latch 168 is provided to hold the digital value defining the current adjustment to the position of the head 20 relative to a Crack 16'. The output of the DAC latch 168 is provided via lines 170 to the DAC driver unit 172. A digital-to-analog converter within the DAC driver 172 converts the digital value to a corresponding analog value. An analog amplifier, whose amplification factor is variably controlled by a control signal provided via line 176 from the internal controls latch 174, current buffers amplify the digital-to-analog converter output signal. Whether or not amplified, the resulting analog signal is provided to a high output current capable driver operating from an internally provided $V_{DD}$ voltage source 188. The analog driver in turn provides a high current capable differential voltage onto the voice coil control lines 112.

The internal controls latch 174 is provided to latch a digital word from the data bus $86_1$. The bit positions of the latched word define the states of the amplification control signal provided on line 176, a conversion enable signal provided on line 178, an awake enable signal via line 182 and an unlatch control signal on line 184 the awake control signal is provided to enable normal operation of the DAC driver 172 and a latch driver circuit 190. Absence of the awake signal effectively disables the high operating current portions of the DAC and latch driver circuits 172, 190. Withdrawal, in turn, of the unlatch control signal, as provided on line 184, results in the latch circuit 190 releasing the actuator latch. The latch operates from a corresponding latch signal on line 114. Absence of the latch signal on line 114 allows the actuator to be mechanically held with the head 20 over a preselected landing zone, typically within the inner diameter of the track band 16.

A power switch 192, operating from a power source $V_c$ 186 enables selection of a low-power mode and an even lower power consumption sleep mode. The low power and sleep modes are selected, respectively, by provision of a cycle control signal via line 180$_3$ and the awake control signal on line 182. Both signals are generated by the setting or resetting of corresponding bits in the internal controls latch 174. Depending on the state of take cycle control signal alone, switched 5 volt power is provided or not on the +5 $V_c$ line 130. Withdrawal of power from line 130 results in the substantial termination of operation of the read/write support circuit 90. Withdrawal of the awake control signal results in both the switched +5 $V_c$ power on line 130 and switched 12 volt power $V_{DD}$, on line 188 being terminated. Consequently, power consumption by the DAC and latch drivers 172 190 are also terminated for the duration of the sleep mode period.

A current-to-voltage buffer 194 is provided to convert the spin return current on line 120 to a corresponding voltage level on the spin sense line 122$_1$. The current-to-voltage buffer 194 is responsive to the awake control signal provided on line 182 for open circuiting the current return path from the spin driver circuit 96. Thus, in the sleep mode, power consumption by the driver 96 and spin motor 18 is also eliminated.

Finally, the control support circuit 88 includes a gain and differential amplifier unit 196. The unit 196 receives the peak analog voltages provided on lines 126$_{1-4}$ from the peak hold circuits 152$_{1-4}$, 154$_{1-4}$. In response, the gain and difference amplifier unit 196 provides current buffered analog voltages on peak output lines 122$_{2-5}$. These output voltages are provided with a fixed, preferably unity gain relationship to the input voltages on lines 126$_{1-4}$. The awake control signal on line 182 is also provided to the gain and difference amplifier unit 196 to disable operation and, therefore, current consumption. A reset signal is provided from the internal controls latch 174 on line 180$_1$ and an Odd control signal is provided on line 180$_2$. The reset control signal causes the input lines 126$_{1-4}$ to be grounded so as to discharge the respective capacitors 154$_{1-4}$ in preparation for processing the next series of servo bursts. The gain and difference amplifier unit 196 also includes analog combinatorial logic to generate a $P_{diff}$ output signal. Generation of the $P_{diff}$ signal is performed in accordance with either Equation 1 or 2, depending on the state of the Odd control signal on line 180$_2$.

$$P_{diff(even)} = (IA+IB)-(IC+ID) \qquad 1$$

$$P_{diff(odd)} = (IC+ID)-(IA+IB) \qquad 2$$

C. High-Performance Arbitrating Buffer/Sequencer Control Architecture

Figure 5:
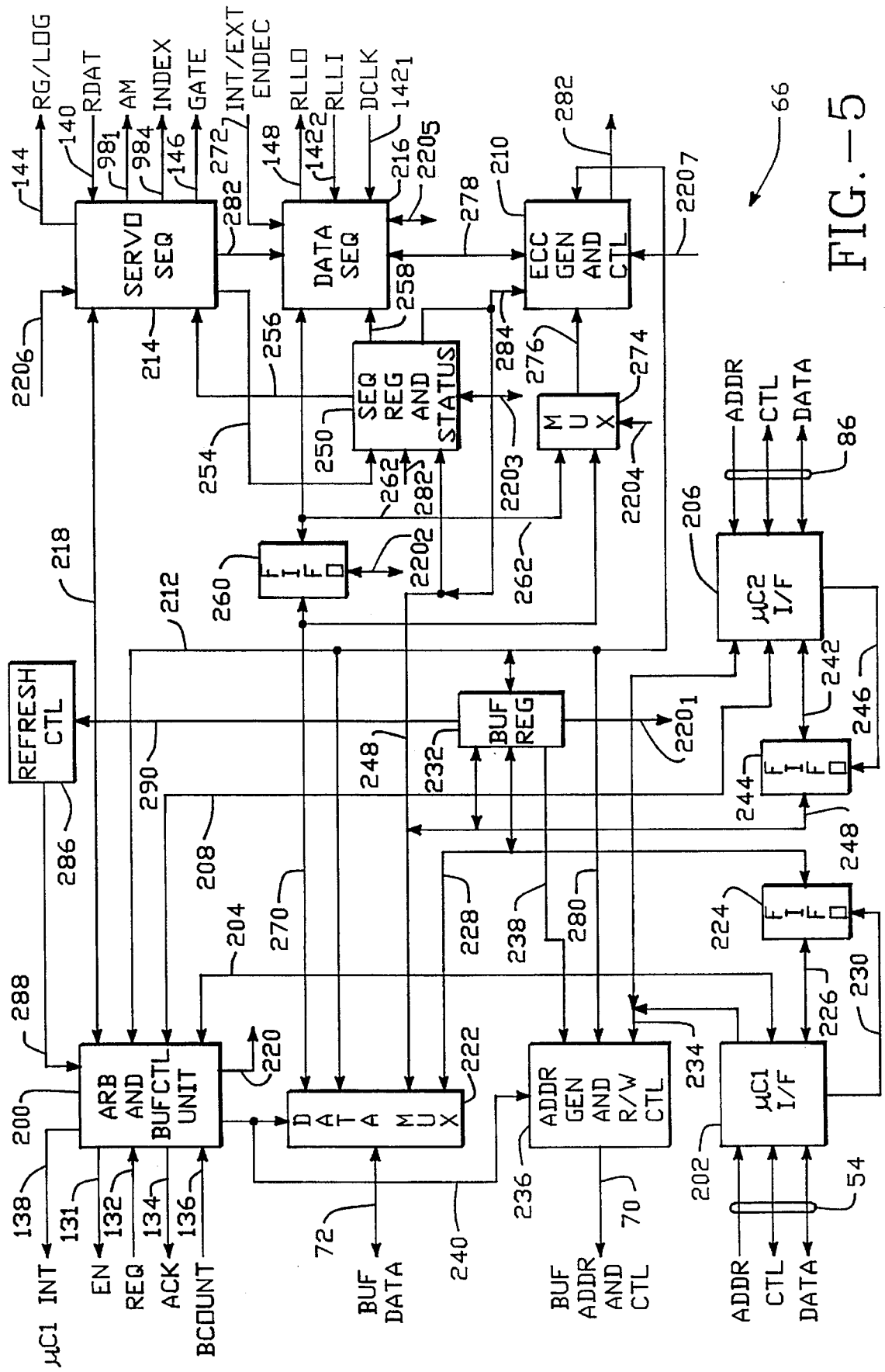
FIG. 5 is a details block diagram of the buffer control and sequencer unit constructed in accordance with a preferred embodiment of the present invention.

Referring now to FIG. 5, a detailed block diagram of the buffer/sequencer 66 is shown. Central to the buffer/sequencer 66 is an arbitration and buffer control unit 200 that internally incorporates request arbitration logic for resolving data access requests to the buffer memory 68 and corresponding logic for controlling the buffer memory access operation required for each data requestor. Requests for data access transfers with respect to the buffer memory 68 are received from the host interface unit 50 via line 132 and the internal components of the buffer/sequencer 66, including a host microcontroller interface unit 202 via one of control lines 204, a low-level microcontroller interface unit 206 via one of control lines 208, an error correction code (ECC) generation and control unit 210 via one of control lines 212, and from the servo and data sequencer units 214, 216 via one of controls lines 218.

Upon arbitrated acceptance of a data transfer request, the arbitration and buffer control unit 200 provides an acknowledgment signal via the appropriate acknowledge control line 134, 204, 208, 212, 218. Initiated concurrent with the acknowledgement signal, the arbitration and buffer control unit 200 provides control signals via the internal control bus 220 to direct the data transfer specific operation of the arbitration selected internal component of the buffer/sequencer 66. The host interface unit 50, however, incorporates its own internal data transfer control logic and, therefore, operates directly from the acknowledge signal on line 134 and a shared system clock signal to synchronize its data transfer operations with the buffer/sequencer 66. In all cases, the arbitration and buffer control unit issues the control signals, on lines 240, necessary to select a data transfer direction and multiplexer input/output line of a data multiplexer 222, or move where a data transfer is to or from the host interface unit 50 and address source that is to be used by an address generation and read/write control unit 236.

Data transfers by the host microcontroller 52 are passed via the host microcontroller interface unit 202 through a selectable, bi-directional one or two byte depth FIFO unit 224 via data bus 226 to the data multiplexer 222 via bus 228. Table III lists the buffer control registers accessible to the host microcontroller 52 in the buffer register unit 232. Since, in the preferred embodiments of the present invention, the host and low-level microcontrollers are both based on 8-bit processors, the data FIFO 224 appears as two byte-wide registers locations in the memory map of the host processor 52.

TABLE III

| Register | Size | Dir. | Function |
|---|---|---|---|
| | μC1 Buffer Access Registers | | |
| Configuration Control and Status | 4 bit | R/W | Control values written by μC1 to enable host interface transfers and to select the transfer direction; status of buffer memory data transfers. |
| Page Access Address | 11 bit | R/W | value selects a 512 buffer memory page-address bits [19:9]. |
| Location Access Address | 9 bit | — | Transferred from the low order bits [8:0] of Host Address value. |
| Data Transfer | 16 bit | Write | Data transfer registers; contain the data transferred to or from the data buffer. |
| Host Address PC Preload | 20 bit | Write | Preload latch for Pointer/Counter value used for Host data transfers. |
| Host Address PC | 20 bit | Read | Pointer/Counter value as used for Host data transfers. |
| Host Address PC Transfer | 1 bit | Write | Write to any bit in this register transfers the Host Address PC from the Preload latch. |

Data transfer requests are issued by the host interface 50 to the arbitration and buffer control unit 200 on the request line 132. Such requests, when received, are treated by take arbitration and buffer control unit 200 at generally the lowest priority recognized by the arbitration and buffer controller unit 200. With the request signal, a byte count request value is also provided to the arbitration and buffer control unit on the control lines 136. The byte count value indicates the number of bytes that the host interface unit 50 will attempt to transfer in successive burst access cycles within a single request/acknowledge cycle.

With the provision of the acknowledgement signal on line 134, the host interface unit 50 begins a data transfer with respect to the buffer memory 68. Data is transferred via the shared data bus 72. However, the buffer/sequencer unit 66 is responsible for generating the buffer access addresses. Specifically, data transfers by the host interface unit 50 are stored in the buffer memory 68 at a location specified by an address stored in the Host Address PC register (Table III). The Host Address PC register is initially loaded with an address held in the Host Address PC Preload register. This address is programmed into the Preload register by the host microcontroller 52 in anticipation of a host interface unit 50 data transfer request.

That is, during a command phase of operation, the host interface unit 50 typically receives a host-level command that may require the transfer of data via the host interface 12. This host-level command is transferred to the microcontroller 52 for processing into one or more low-level commands. In the preferred embodiments of the present invention, the microcontroller 52 implements a queue list of such commands, block address locations and respective completion/error status in the RAM memory 62. The commands may be there evaluated for appropriateness of order of execution, selection of the actuator controller 32, 34 that is most appropriate to execute the command, whether and where requested data is present in the buffer memory 68, 68', an available block address where data newly read from the disk 14 is to be placed in the buffer memory 68, and other considerations that may affect the performance and reliability of the transfer of data by the system 10.

Where requested data is not present in the buffer 68, a command and corresponding block address is passed to the microcontroller 80 to have the data retrieved and placed at the specified block address. On subsequent retrieval of the requested data into the buffer 68, another interprocessor command is passed to the microcontroller 52 to allow it to re-initiate an appropriate host interface operation whereby the host interface reasserts a data request signal on line 132.

Where data is to be transferred into the buffer memory 68 or when outgoing data is present in the buffer memory 68, the host microcontroller 52 appropriately programs the Host Address PC Preload register with the block address for the next buffer/sequencer 66 operation. An interrupt of the microcontroller 52 by the host interface 50 signals the end of a current transfer operation. In response, the microcontroller 52 sets the transfer direction of the buffer/sequencer 66 for the next data transfer operation and then performs a write access of the Host Address PC Transfer register, thereby loading the Preload register programmed address into the Host Address PC Register. In the following data transfer phase of operation by the host interface unit 50, the requested block of data is transferred by a series of request/acknowledge cycles between the host interface unit 50 and the buffer memory 58. With each data byte or word transfer, the address in the Host Address PC register is correspondingly incremented by the arbitration and buffer control unit 200. Meanwhile, the microcontroller 52 determines the block address for the next data block transfer and programs this address into the Host Address PC Preload register. Since data transfers via the host interface 12 are typically of multiple successive data blocks, the microcontroller 52 is able to anticipate each data block transfer and minimize the elapsed time between successive data block transfers by preloading the next host address PC value concurrent with a present data block transfer. Latency between successive data block transfers is essentially reduced to the time required for the microcontroller 52 to be interrupted, to change as necessary the next data transfer direction and to perform a write operation to the Host Address PC Transfer register.

For accesses of the buffer/sequencer 66 by the microprocessor 52, the microcontroller interface unit 202 determines the direction of data transfers between the host microcontroller 52 and buffer/sequencer 66 from the control portion of the host microcontroller bus 54. In turn, the microcontroller interface unit 202 controls the transfer dissection and byte shift loading and unloading of the data FIFO 224 via a control signal on line 230. The requested direction of the data transfer is also provided via control lines 204 to the arbitration and buffer control unit 200 so as to permit appropriate configuration of the data multiplexer 222 and address generator 236 for the transfer.

The address of a host microcontroller requested data transfer is controlled by a page address offset value stored in a Page Access Address register of a buffer register unit 232 and bits 8:0 of the address value provided on the address portion of the bus this low-order partial address is reflected through a Location Access Address register within the host microcontroller interface unit 202 to the address generation unit 236 on a partial address bus 234.

Thus, in execution of a data transfer, the microcontroller interface until 202 transfers the least significant bits 8:0 of the address to the input lines 234 of the address generation unit 236. A control signal on one of the lines; 220 enables the page address offset value to be provided from the Page Access Address register of the buffer register 232 to the address generator 236 via lines 238. A composite address is then generated by the address generator 236 in response to control signals provided via the control lines 240 from the arbitration and buffer control unit 200. Data is then transferred between the data multiplexer 222 and FIFO 224 via the internal data bus 228.

In a manner similar to the host microcontroller interface unit 202, the low-level microcontroller interface unit 206 exchanges control information with the arbitration and buffer control unit 200 via control lines 208, transfers data via bus 242 and a location address via the partial address bus 234. Buffer memory 68 access requests are preferably treated at a priority level below that of the host microcontroller interface unit 202. The data bus 242 connects through another bi-directional, one or two byte deep FIFO 244 that is controlled by the low-level microcontroller interface unit 206 via control line 246. The FIFO 244 connects via an internal data bus 248 to the buffer register 232 and a bi-directional data port of the data multiplexer 222. The data bus 248 is further connected to an access port of the buffer register 232 and, separately, to an access port of a sequencer control and status register 250. Finally, through the low-level microcontroller interface unit 206, the microcontroller 50 has access to the interprocessor register set shown in Tables I and II and to the buffer access register set shown in Table IV.

TABLE IV

µC2 Buffer Access Registers

| Register | Size | Dir. | Function |
|---|---|---|---|
| Configuration Control and Status | 4 bit | R/W | Control values writtne by µC2 to enable disk sequencer data transfers and to select the transfer direction; status of buffer memory data transfers. |
| Configuration Control | 4 bit | Write | Control value written by µC2. |
| Page Access Address | 11 bit | R/W | Value selects a 512 buffer memory page-address bits [19;9]. |
| Location Access Address | 9 bit | — | Transferred from bits [8:0] of the 1-east significant nine portions of the low-level microcontroller address value - |
| Data Transfer | 16 bit | Write | Data transfer registers contain the data transferred to or from the data buffer |
| Disk Address PC Preload | 20 bit | Write | Preload latch for Pointer/Counter value used for Disk data transfers |
| Disk Address PC | 20 bit | Read | Pointer/Counter value as used for Disk data transfers |
| Disk Address PC Transfer | 1 bit | Write | Write to this register transfers the Disk Address PC from the Preload latch |
| ECC Address PC | 20 bit | Read | Pointer/Counter value as used for error correction accesses of the buffer memory |

In addition, the microcontroller 80 is also able to program and read status information from the servo control, disk data sequences and ECC controller register sets. As will be discussed in greater detail below, the data values stored in the sequencer control and status register 250 generally define the disk related operation of the buffer/sequencer unit 66.

The servo sequencer unit 214 and data sequencer unit 216 operate cooperatively in the transfer of data through the buffer/sequencer 66. Specifically, the servo sequencer 214 is responsible for searching the raw data, as received via the raw data line 140, to identify address marks, to identify the occurrence of an index sector, and to generate the servo burst gate signals. The microcontroller 80 controls the function of the servo sequencer 214 through the servo control and status registers shown in Table V.

TABLE V

µC2 Servo Control Registers

| Register | Size | Dir. | Function |
|---|---|---|---|
| Servo Index | 8 bit | Write | Servo index value |
| Servo ID | 16 bit | Read | Servo cylinder and ID values from sector header |

TABLE V-continued

µC2 Servo Control Registers

| Register | Size | Dir. | Function |
|---|---|---|---|
| Servo Status and Control | 8 bit | R/W | Servo control status; enabling of write gate operation; enable disk precompensation |

The servo sequencer 214 further generates a new sector control signal on control line 252 to effectively define the start of a sector data area for the data sequencer 216.

Once the beginning of a sector is detected, the servo sequencer 214 generates, at appropriate timing points, the quadrature servo burst gate enable signals on lines 146 to select out the servo bursts from the sector header data of the current sector. The servo sequencer 214 also transfers the current cylinder and sector ID information from the sector header data and places the information, via lines 254, in the Servo Index and Servo ID registers in the sequencer control and status register 250. These cylinder and sector values can then be immediately read via the data bus 248 and through the low-level microcontroller interface unit 206 by the microcontroller 80. Configuration information, such as a mark search signal to initiate a hunt for an address mark in the raw data stream, is programmed by the microcontroller 80 into predefined bit locations in the servo status and control register units from the sequencer control and status register 250. Corresponding enabling signals are then provided to the servo sequencer 214 via control lines 256.

Similarly, the sequencer control and status register 250 includes data registers, programmable by the microcontroller 80, that effectively define the operational configuration of the data sequencer 216. These registers include those shown in Table VI and the registers of a conventional disk data sequencer, such as the Cirrus Logic CL-SH260, as described in the Cirrus Logic data sheet book SH4A, available from Cirrus Logic Inc., 3100 W. Warren Avenue, Building I-905, Fremont, Calif.

TABLE VI

µC2 Disk Sequencer Registers

| Register | Size | Dir. | Function |
|---|---|---|---|
| Sequencer Controls | 8 bit | Write | Define the branch addresses for sequential processing of a data sector. |
| Sequencer Status | 8 bit | Read | Status information including a read ECC error, read CRC error, ID and data sync byte detected, and hardware ECC correction complete. |
| Sequencer Control Store | 8 bit | Write | The Writable Control Store of the data sequencer. |
| Sync Pattern | 8 bit | Write | Defines the data patterns for sync fields. |
| Sector Size | 8 bit | Write | Size of a data sector |

The register data values are provided to the data sequencer 216 via control lines 258. The data sequencer 216, in general, functions as a data serializer/deserializer and run length limited (RLL) data encoder/decoder. Serialized write data is provided on the write data output line 148. The read data clock and clock separated NRZ read data are received on the input lines $142_{1-2}$. Parallel data is transferred to and from the data sequencer 216 via the data bus 262. A bi-directional, 16 byte deep FIFO 260 connects the data bus 262 to a data port 270 of the data multiplexer 222.

The arbitration and buffer control unit 200 monitors and directs the transfer of data between the data buffer 68 and the data sequencer 216. Each sector data block transfer is initiated by the programming of a data transfer select bit and a direction bit in a Sequencer Control register of the sequencer control and status register 250 by the microprocessor 80. The selection and direction bits are programmed on a per sector basis to define whether a transfer is to occur and if so, the direction. Where the transfer is to the disk 14, the data sequencer 216 immediately provides a data transfer request control signal to the arbitration and buffer control unit 200 via the control lines $220_5$ to prefetch data from the buffer memory 68 into the FIFO 260, though subject to any presently active disk data transfer operation. Since disk data transfers through the data sequencer 216 must be synchronous with disk rotation, the arbitration and buffer control unit 200 generally treats such transfers as its highest priority buffer requests. For data transfers from the disk 14, the request is placed with the arbitration and control unit 200 as data is first loaded into the FIFO 260. In both cases, the Disk Address PC register in the buffer register 232 is utilized by the arbitration and buffer control unit 200 as the source of the disk address transfer location within the buffer memory 68.

As with the Host Address PC address, the Disk Address PC address is loaded from a Disk Address PC Preload address register in response to a write access of a Disk Address PC Transfer register by the microcontroller 80. Since each data transfer to or from the disk 14 is initiated by the microcontroller 80, the Disk Address PC Preload register can be programmed during a current data transfer operation. Overhead processing by the microcontroller 80 is substantially reduced by requiring only a single write access to transfer the next bluffer memory address into the Disk Address PC register and a write access to set the next data transfer direction and enable the data sequencer to perform the operation. A control signal provided via control lines $220_1$ to the buffer register 232 places the contents of the Disk Address PC register on lines 238 to the address generator 236. The resulting buffer address is then provided onto the address portion of the buffer address and control lines 70. The data multipler 222 is selected to return the corresponding data from the buffer memory 68 via the data port lines 270 to the FIFO 260. The arbitration and buffer control unit 200 thereafter monitors and controls the flow of data through the FIFO 260 as necessary to support the continuous data transfer operation of the data sequencer unit 216. With each access of the buffet 68, the address held in the Disk Address PC is incremented until a full sector data field has been transferred. The sector byte length, typically 516 bytes (512 data bytes plus 4 CRC bytes) is established by a value programmed into the Sector Size register in the sequencer control and status register 250 by the microprocessor 90. Thus, the data sequencer 216 simple operates to access the FIFO 260 to transfer the steady stream of data required to support its internal data sequencer operation. Coordination of data through the FIFO 260 and data multiplexer 222, including the incrementing of the Disk Address PC values to provide data buffer addresses is performed by the arbitration and buffer control unit 200 via control signals provided on the control lines $220_1$, $220_2$, $220_5$ and 240.

The data sequencer 216 also cooperates with the ECC generation and control unit 210 to facilitate the hardware generation and correction of data errors. On transfer of data from the buffer memory 68 to the FIFO 260, the arbitration and buffer control unit 200 selects a multiplexer 274 via control line $220_4$ to also route the data onto the ECC unit input line 276. Control signals provided on lines $220_7$ initiate and define the operation of the ECC generation and control unit 210. The buffer delay afforded by the prefetching of data into the FIFO 260 allows sufficient time for the ECC generation control unit 210 to generate a sector ECC value, typically eleven bytes in length, at or before the data sequencer transfers the last sector byte from the FIFO 260. The sector ECC value is passed to the data sequencer 216 via control lines 278. The data sequencer 216 controls the transfer of the ECC value bytes so as to seemlessly append the sector ECC value to the end of the sector data received via data bus 262; the disk sector data field, including ECC, is therefore typically 527 bytes in length.

For read data transfers, the multiplexer 274 is selected by control lines $220_4$ to pass the read data stream from the data bus 262 onto the ECC unit input lines 276. As the data is received, the ECC value is recalculated. The prior calculated sector ECC value, as read from the disk 14, is not written to the FIFO 260, but rather is redirected via lines 278 to the ECC generation and control unit 210. The recalculated sector data ECC value is compared to the prior calculated ECC value as read by the data sequencer 216. Once the comparison is complete, the ECC generation and control unit 210 writes an ECC status bit into an Error Control and Status register of the sequencer control and status register 232, via line 282, to indicate whether the sector read contained any bit errors. The Error Control and Status register, and the other registers used by the ECC generation and control unit 210, is shown in Table VIII.

TABLE VIII

| μC2 ECC Control Registers | | | |
|---|---|---|---|
| Register | Size | Dir. | Function |
| Error Control and Status | 8 bit | R/W | Control bits for selecting "on the fly" hardware error correction, byte shifting the correction shift register; status bits for identifying an ECC error, correction of an ECC error, and uncorrectability of an ECC error. |
| Error Offset Counter | 14 bit | Read | On ECC error detected, decremented to determine the error location. |
| Error Offset Counter Preload | 14 bit | Write | Preload latch for the maximum possible error offset. |
| Correction Shift Register | 80 bit | Hidden | ECC error correction shift register. |
| Correction Shift Register Access Port | 8 bit | Read | Least significant byte the correction shift register. |

Where an error has been detected, the ECC generation and control unit 210 will, if enabled by a hardware correction control bit in the Error Control and Status register, as presented via line 284, autonomously attempt to identify and correct the data error on the data as now stored in the buffer memory 68. A maximum correctable error value will have been programmed into the Error Offset Counter Preload register by the microprocessor 80 in conjunction with setting the hardware correct on enable control bit in the Error Control Status register. This preloaded value represents the maximum number of bit shifts that can be theoretically performed on the ECC Correction Shift Register for the given data sector size. The Error offset counter preload value is calculated as (Sector Size×4)–3. The value is loaded into the Error Offset Counter register upon initiation of a hardware ECC error correction cycle. Also, the Disk Address PC value, then corresponding to the address of the last byte of sector data now stored in the buffer memory 68, is transferred to the ECC Address PC register (Table IV).

To actually identify the location of the bit error within the sector data, the ECC values, as recalculated and a read from the disk 14, are processed through a Correction Shift Register. The Error Offset Counter value is decremented with each shift of the Correction Shift Register and the ECC Address PC value is decremented after each eight shifts of the Correction Shift Register. Upon finding the location of the error and determining that the error is correctable, the ECC generation and control unit 210 requests a buffer memory access by providing an access request on the control lines 212 to the arbitration and buffer control unit 200. Preferably, ECC generation and control unit 210 requests are treated by the arbitration and buffer control unit 200 at a priority below that of the host and low-level microcontroller interface units.

The ECC generation and control unit 210 will preferably perform up to three read/modify/write buffer access cycles as necessary to correct an ECC error. In each cycle, a buffer read access will obtain a sector data byte located at the ECC Address PC value as provided from the buffer register 232 through the address generation and read/write control unit 236 to the buffer memory 68. This sector data byte is returned via the data multiplexer 222 via the control lines 212 to the ECC generation and control unit 210. Once modified, the sector data byte is written back to the buffer memory 68 and the ECC Address PC value in the buffer register 232 is decremented.

If the ECC error location is found by the ECC generation control unit 210, but the error is determined to be uncorrectable, a corresponding status bit is set in the Error Control and Status register. Microcontroller 80 may implement, in its firmware routines, a more extensive algorithm for correcting ECC detected errors. Accordingly, the microcontroller 80 may read out the syndrome value present in the correction shift register through successive accesses of the Correction Shift Register Access Port register. Each access will retrieve the least significant byte of the syndrome. Between successive reads, a write of a byte shift enable bit in the Error Control and Status register will right shift the syndrome value in the Correction Shift Register by eight bits, thereby allowing the entire syndrome to be successively read.

Finally, a failure to find the location of an ECC error is detected upon expiration of the Error Offset Counter value. In this circumstance, the hardware correction cycle is terminated and a corresponding error status bit is set in the Error Control and Status register. In this or the prior ECC error circumstance, the microcontroller 80 may determine to discard the data containing the ECC error and reread the data from the disk 14. In any case, the microcontroller 80 may report the nature, extent and location of the error by a corresponding command and block address reference value via the interprocessor registers to the host microcontroller 52 for further error handling, including statistical and historical record keeping.

The final source of buffer access requests is a refresh control unit 286. The refresh control unit 286 is only required where the buffer memory 86 utilizes dynamic memory cells, as opposed to being of a static memory design. Access to the buffer memory 68 is periodically requested by the refresh control unit 286 by provision of a request control signal to the arbitration and buffer control unit 200 via a control line 288. Given the need for maintaining the data integrity of the memory buffer 68, a refresh cycle request is treated as the highest priority request by the arbitration and buffer control unit 200. Upon grant of the request, the arbitration and buffer control unit 200 directs a conventional dynamic memory refresh cycle access of the buffer memory 68. A binary value representing the desired dynamic memory refresh cycle time is programmed by the microcontroller 52 into a refresh register within the buffer register 232. This refresh value is transferred via lines 290 to the refresh controller 286. The refresh register is shown in Table IX.

TABLE IX

| μC1 DRAM Refresh Registers | | | |
|---|---|---|---|
| Register | Size | Dir. | Function |
| Refresh | 6 bit | Write | Specifies DRAM refresh period |

D. Small Computer System Interface (SCSI) Host Interface Architecture

Figure 6:
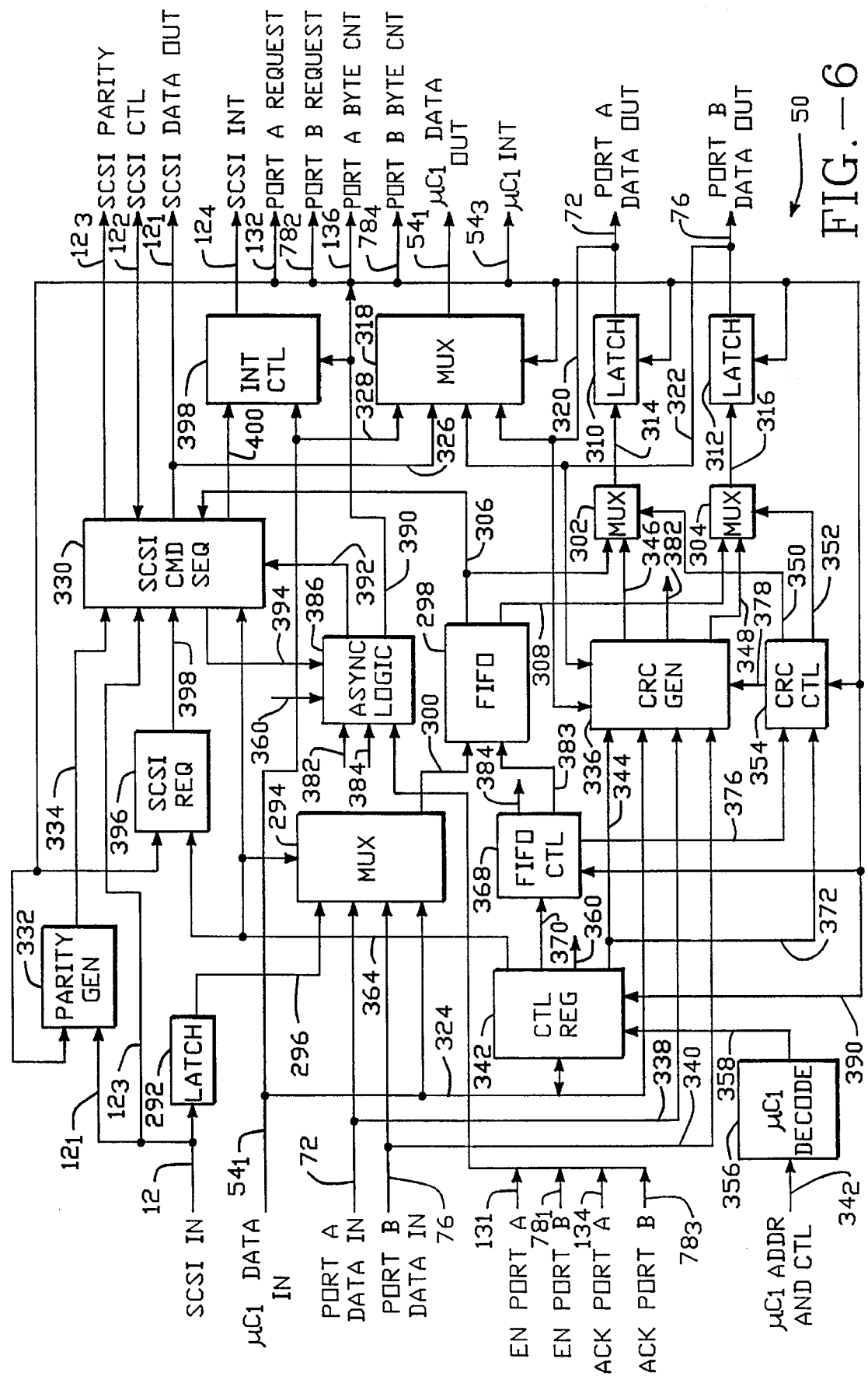
FIG. 6 is a detailed block diagram of a preferred embodiment of the interface support circuit constructed in accordance with a preferred embodiment of the present invention.

A detailed block diagram of a preferred embodiment of the host interface unit 50 is shown in FIG. 6. As will be seen, the host interface unit 50 is required to manage the controlled transfer of data between a number of potential data sources and data destination ports. For the preferred embodiment of host interface unit 50 shown in FIG. 6, the potential sources of data include the host interface 12, in this instance a small computer systems interface (SCSI), the data portion 54, of the data, address and control bus 54 and the two data ports, port A and port B, that connect to the shared data buses 72, 76 of the respective actuator controllers 32, 34. The same set of data sources are potential data destinations as well.

The primary inbound data path through the host interface unit 50 begins with the data portion of the host interface 12 being coupled through a data latch 292 to an input of a multiple input, single output data path multiplexer 294 via the internal data bus 296. The output of the multiplexer 294 is connected to a 17 byte deep FIFO 298 via a data bus 300. A port A output of the FIFO 298 is connected through a multiplexer 302, via lines 306, and an output latch 310, via lines 314, to the port A shared data output bus 72. In a similar manner, a port B output of the FIFO 298 is connected through a multiplexer 304, via lines 308, and an output latch 312, via lines 316, to the port B shared data output bus 76.

Data from the host microcontroller 52 representing a secondary inbound data path, is routed via the data lines 324 to another input of the multiplexer 294. From there, the data path for data originated by the microcontroller 54 is substantially the same as for host interface data. However, data provided on the port A output of the FIFO 298 can, in addition, be routed via the lines 306 to a SCSI command sequencer 330 for transfer onto the data portion $12_1$ of the SCSI host interface 12. This data path is provided to allow the host microcontroller 52 to provide data directly in support of SCSI commands and responses transferred through the host interface 12.

The port A and port B shared data buses 72, 76 provide the remaining two data inputs to the multiplexer 294. By appropriate routing through the FIFO 298, port A and port B data can be flexibly routed to the SCSI command sequencer 330, to the reciprocal port B or port A shared data bus 76, 72, or to the multiplexer 318 for transfer to the host microcontroller 52 via the data portion $54_1$ of the data, address and control bus 54.

Since the shared data buses 72, 76 provide input data, via lines 320, 322 to the multiplexer 318, the host microcontroller 52 can receive, in parallel, the actual data transferred to the SCSI command sequencer 330 and to the actuator controllers 32, 34. Further, since the data bus portion $12_1$ of the host interface 12 and both shared data buses 72, 76 are bi-directional, the host microcontroller 52 is capable of monitoring the data transferred regardless of the particular data source and destination ports.

In order to preserve and subsequently validate the integrity of data transferred via the host interface 12, each SCSI data word includes a parity bit. The parity bit on inbound data transfers is transferred via the parity bit line $12_3$ to the SCSI command sequencer 330. The data word is passed via the data portion of the host interface bus $12_1$ to a parity generator 332 that, in turn, regenerates a parity bit based on the actual data word received. The regenerated parity bit is provided via the parity bit line 334 to the SCSI command sequencer for comparison with the actual parity bit received. Conventional SCSI handling of a parity error is initiated if the SCSI command sequencer 330 determines that the parity bit comparison has failed.

The validity of data transferred through the host interface 50 is further maintained and checked by associating a cyclic redundancy check (CRC) value to each data block transferred through the host interface unit 50. A CRC generation unit 336, incorporating an internal data source multiplexer, receives each data block as a data stream from the data bus portion $54_1$ of the data, address and control bus 54, from the port A and port B shared data buses 72, 76 via input buses 338, 340 and from the port A and port B shared data buses 72, 76 via the buses 320, 322. Thus, for inbound data from the host interface 12, data transferred ultimately through either the port A or port B shared data buses 72, 76 is routed via the internal data bus lines 320 or 322 to the CRC generator 336. Then, depending on the data block destination, the resulting CRC value is provided onto the CRC output lines 346 or 348 through the multiplexers 302, 304 and output latches 310, 312, to the shared data buses 72, 76.

In the preferred embodiments of the present invention, the CRC generator 336 produced a four byte CRC value for each inbound 512 byte block of data transferred to the port A or port B shared data buses 72, 76. This four byte CRC value is appended to the 512 byte block through the operation of the multiplexers 302, 394 and a continuation of the write accesses of the buffer memory 68. The depth of the FIFO 298 is generally adequate to allow the receipt of the next block of inbound data to proceed while the current block is processed through the CRC generation unit 336, the additional buffer memory 68 accesses necessary to append the CRC value to the current block in the buffer memory 68 are performed, and hardware reinitialization of the CRC generation unit with a CRC seed value is completed.

For outbound data transfers, data from either the port A or port B shared data buses 72, 76 is routed via the internal data buses 338 or 340 to the CRC generation unit 336 concurrent with the data transfer through the multiplexer 294 and into the FIFO 298. Data from the FIFO 298 is passed to the port A bus 306 to the SCSI command sequencer 330 for output to the host interface 12. At the conclusion of the data block transfer to the FIFO 298, the four bytes representing the prior calculated CRC value are transferred in from the port A or port B buses 72, 76 to the CRC generator 336; the CRC value is not place into the FIFO 298. The recalculated CRC value is then compared against the prior calculated value. Where there is a CRC comparison failure, a control signal is passed from the CRC generation unit 336 to the SCSI command sequencer 330 to indicate that the outbound data block contains a data error and should be discarded by the ultimately receiving host.

The control path function of the host interface unit 50 is implemented via a microcontroller decode unit 356, a control register unit 342 and an asynchronous logic block 386. Supplemental control path support is provided by a FIFO controller 368, CRC generation unit controller 354, SCSI request latch 396, and an interrupt controller 398.

Where the SCSI command sequencer has received an inbound SCSI command on the host interface 12, the command and associated data will have been loaded into the FIFO 298. A control signal on one of the lines 394 will cause the asynchronous logic unit 386 to issue an interrupt on line $54_3$ to the host microcontroller 52. On successive reads of a memory location corresponding to the output bus $54_1$ of multiplexer 318 and that is recognized by the microcontroller decode unit 356 to select the FIFO 298, multiplexer 302 and latch 310, the SCSI command and associated data may be read out by the microcontroller 52 and queued. Once the microcontroller 52 has directed the execution of the series of low-level commands, if any, necessary to begin a response to the SCSI command, the next state of operation is determined for the host interface unit 50 and buffer/sequencer 66. The microcontroller 52 establishes this state by programming the control register unit 342 of the host interface 50 and the buffer register 232 of the buffer/sequencer 66 as appropriate for the transfer of data between the host interface unit 50 and the buffer memory 68. On completion of each block transfer, where the programmed quantity of data has been transferred and, typically, in order for the address in the Host Address PC register to be updated, the asynchronous logic unit 386 again causes an interrupt to be generated on line $54_3$ to the microcontroller 52.

The control register unit 342 is thus provided for the static storage of static configuration parameters for the host interface unit 50, for the storage of dynamic control values that may be reprogrammed by the host microcontroller 52 in order to modify the operating state of the host interface unit 50, and to make accessible status values that dynamically reflect the operating state of the host interface unit 50. The control register unit 342 is preferably memory mapped within the address space of the host microcontroller 52. Thus, by providing the appropriate address and control signals, the address and control bus $54_2$, a corresponding register select signal will be provided via the control lines 358 to the control register unit 342. Data provided on the data portion $54_1$ of the data, address and control bus 54 can then be written into the corresponding control register via the internal bus 324. If, however, the microcontroller 52 requests a read operation, the contents of the address referenced register of the control register unit 342 is transferred onto the internal data bus 324, 328 and through the multiplexer 318 onto the data portion $54_1$ of the data, address and control bus 54.

The values stored in the control register unit 342 include a bit position to generate a control signal on one of the control lines 364 to the SCSI request unit 396 to request a SCSI command arbitration and execution transaction. This request signal, provided via line 398, to the SCSI command sequencer 330 is first synchronized to the internal operation of the host interface unit 50 by the provision of a control signal from the asynchronous logic unit via control lines 390. Additional configuration control signals are provided on the control lines 364 directly to the SCSI command sequencer 330. One additional control signal is directed to the multiplexer 294 for selection of one of its four data inputs to be coupled to the multiplexer output bus 300.

Another value stored by the control register unit 342 is a CRC seed value that is cycled, via the control lines 344, to the CRC generation unit 336 on reinitialization of the CRC generation unit 336. This initial value is used to prime the logic implementing the CRC generation algorithm. As such, it may be a static value programmed into the control register unit 342 at any prior point in time by the microcontroller 52. Alternately, the host microcontroller 52 may select the seed value based on an aspect of the data block with which it is to be used. That is, the logical sector number or a permutation thereof, for example, could be used as the seed value to insure that data for which an identical CRC value would be calculated, or even identical data inadvertently read from a different logical sector, would not yield a recalculated CRC value that matches the prior calculated CRC value. Consequently, the CRC value effectively protects against not only data errors occurring at any point between the host interface unit 50 and the disk 14, including the data while stored in the buffer memory 68 and as processed through the buffer/sequencer 66, but also against mechanical and firmware errors that may result in the reading of a data block from an improper location on the disk 14.

Another control signal generated from a value stored in the control register unit 342 is provided via control line 372 to enable the operation of the CRC control unit 354. A similar control value generates configuration control signals on the lines 370 to the FIFO control unit 268. Additional control signals for defining the operation of the FIFO 298 are received by the FIFO control unit 368 via the control lines 390 originating with the asynchronous logic unit 386. The coordinated operation of the CRC generation unit 336 and FIFO 298 is achieved by way of control signals provided on the control lines 376 from the FIFO control unit 368 to the CRC control unit 354 and then to the CRC generation unit 336 via the control lines 378.

A number of control values are stored in the control register unit 342 and provided on the control lines 360 to the asynchronous logic unit 386 to select the operating control sequence to be performed by the interface 50. Additional control status feedback signals are received by the synchronous logic unit 386 via the control lines 384 from the FIFO control unit 368, control lines 382, including a CRC comparison fail line, from the CRC generation unit 336, and control lines 394 from the SCSI command sequencer 330. In addition, the enable and acknowledge control signals associated with the actuator controllers 32, 34 are received via the control lines 131, $78_1$, 134, $78_3$. In response, the asynchronous logic unit 386 generates sequencer control signals on the output lines 392 and component control signals on the output control lines 390. These component control signals include the port A and B request and byte count signals on lines 132, $78_2$, 136, $78_4$ and an interrupt signal to the host microcontroller 52 on line $54_3$. Internally, the component control signals include multiplexer enable and input select signals provided to the multiplexer 318, latch enable signals to the output latches 310, 312, sequence defining control signals to the CRC controller 354 and status values that are provided back to status registers within the control register unit 342. The component control signals also include enable signals for synchronizing the operation of the parity generator 332 and SCSI request unit 396 to the operation of the SCSI command sequencer 330.

Finally, the interrupt controller 398 acts as a concentrator to produce a single SCSI interrupt signal on line $12_4$ of the host interface in response to a number of different possible interrupt conditions. The sources include, from the SCSI command sequencer 330 a busy/wait interrupt, a select interrupt, and a selected interrupt. The asynchronous logic block 386 is a source of a SCSI parity error interrupt, identification error interrupt and a SCSI reset interrupt, among others. An interrupt mask may be programmed into the interrupt controller via the microcontroller 52 data bus $54_1$ to selectively enable selected sources of a SCSI interrupt.

E. Physical Block (IDE) Host Interface Architecture

Figure 7A:
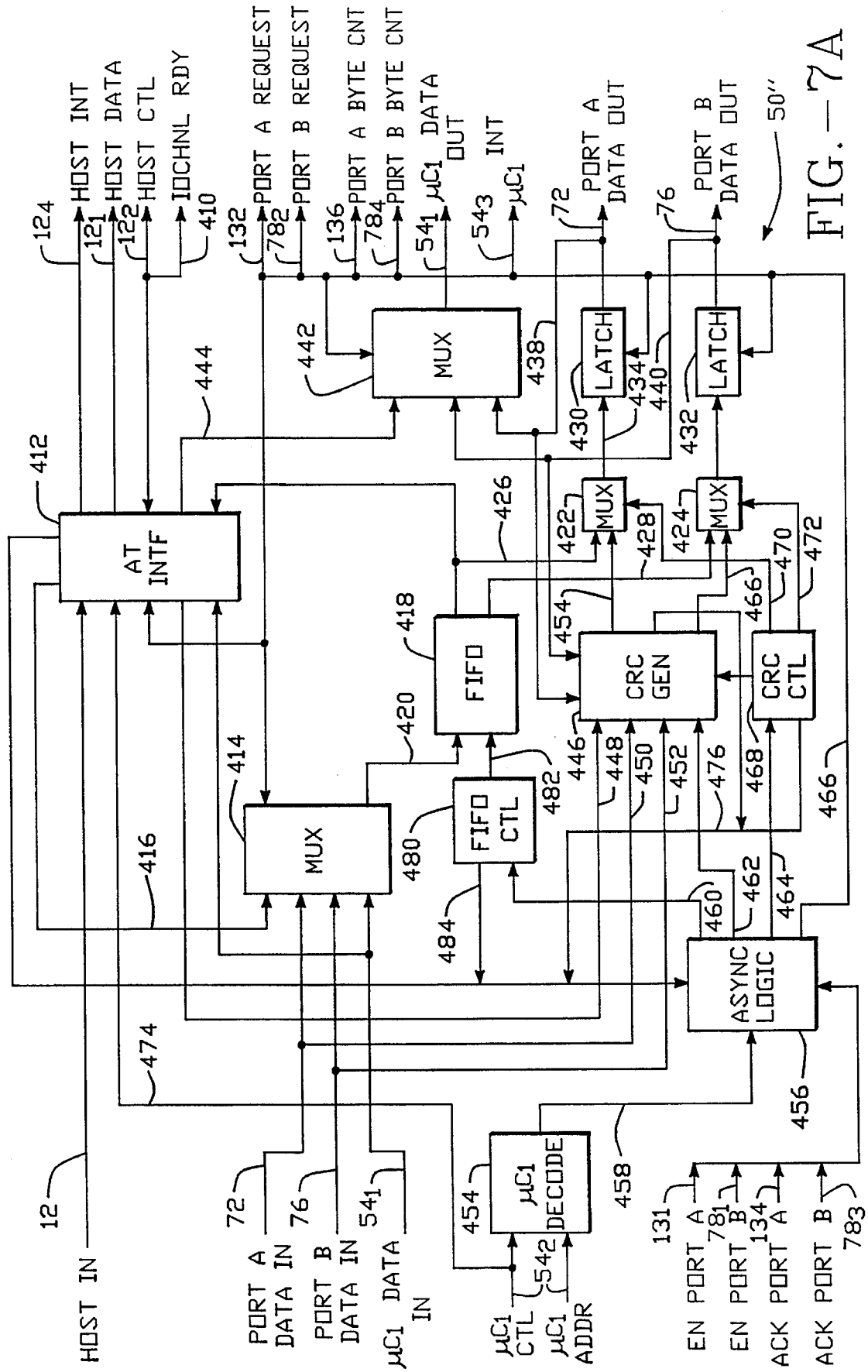
FIG. 7a is detailed block diagram of an alternate interface support circuit constructed in accordance with the preferred embodiment of the present invention.

An alternate architecture of the host interface unit is shown as unit 50" in FIG. 7A. The host unit interface unit 50" is preferred where the system 10 is intended to operate with a host interface 12 that conforms to the industry standard IDE interface. The interface command sequencer 412 incorporates a series of registers for receiving a command and data representing the source or destination of data to be transferred in conjunction with the command. In response, the interface command sequencer 412 generates a number of control signals on the host control lines $12_2$, including specifically an I/O channel (IOCHNL) ready signal, as necessary to allow the interface command sequencer 412 and, as appropriate the microcontroller 80, to set up for the requested command operation.

Data from the host interface 12 is routed to an input of the multiplexer 414 via an internal data bus 416. The other data inputs to the multiplexer 414 include the port A and port B shared data buses 72, 76 and the data portion $54_1$ of the data, address and control bus 54. Data is transferred from the multiplexer 414 to a 17 byte deep FIFO 418 via a multiplexer data output bus 420. Data is transferred out of the FIFO 418 to either or both of two multiplexers 422, 424 via take FIFO output buses 426, 428 and through output data latches 430, 432 via data buses 434, 436 and to the port A and port B shared data buses 72, 76. Data from the FIFO 418 may also be transferred via the data bus 426 to the interface command sequencer 412 for routing onto the host data portion $12_1$ of the host interface 12. Finally, a multiplexer 442 is provided to selectively transfer data from the host interface 12, as bypassed through the interface command sequencer 412 and onto the internal data bus 444, or data being transferred on either the port A or port B shared data buses 72, 76 onto the data portion $54_1$ of the host microcontroller data, address and control bus 54. The multiplexer 442 thereby allows the host microcontroller 52 to monitor all host data transfers and all data transfers to the port A and port B buffer memories 68, 68'.

A CRC generation unit 446 is provided to generate a CRC value, again typically four bytes in length, that is to be uniquely associated with each data block, again typically 512 bytes long, that is received from the host interface 12. Inbound data is routed to the CRC generator 446 via the internal data buses 438, 440, depending on whether the data block destination is the port A or port B shared data bus 72, 76. The CRC value produced by CRC generation unit 446 is provided on either the data bus 454 or 460 to the multiplexer 422 or 424 as appropriate to be appended to the end of the data block just transferred onto the port A or port B shared data bus 72, 76.

The depth of the FIFO 418 is sufficient to accommodate the beginning of the next data block data sufficient to allow the operation of the CRC generation 446 to complete its operation. Further, the CRC generator 446 preferably incorporates a four byte output buffer to which a newly calculated CRC value is transferred and from which it read for appending to its corresponding 512 byte block of data. This output stage within the CRC generation unit 446 allows the unit 446 to be reinitialized pending the next data block transfer.

An outbound data block being received by the host interface unit 50" via the port A or port B shared data bus 72, 76 is transferred via the internal data bus 450 or 452 to the CRC generation unit 446. Once the entire data block hall been received, the multiplexer 414 transfers no further data to the FIFO 418. However, the appended prior calculated CRC value is passed onto the CRC generation unit 446. This prior calculated CRC value is compared against a CRC value recalculated from the data block transfer data. The match/fail status of the CRC value comparison is ultimately reflected in a status condition available to a host connected to the host interface 12.

Operation of the host interface 50" generally follows from the programming of configuration state parameters into registers within the interface command sequencer 412. These values establish the program state of the host interface unit 50". These data values are programmed by the host microcontroller 52 based on their I/O mapped location within the total address space of the microcontroller 52. These data values are provided on the data portion $54_1$ of the host microcontroller data, address and control bus 54 to the interface command sequencer 412. The corresponding I/O address and control signals are provided on the address and control portion $54_2$ of the bus 54 to the microcontroller decode unit 454. The decoded address and control signals are provided to an asynchronous logic unit 456 via the control lines 458. In response, corresponding latch enable signals are provided via the control lines 466 to the interface command sequencer 412 to enable the writing of the supplied data to a corresponding register within the interface command sequencer 412. In a similar manner, existing configuration parameters and status data can be read from the interface command sequencer registers by the host microcontroller One such register within the interface command sequencer 412 is a command register. Once a valid command value has been written to this register, the interface command sequencer 412 de-asserts the I/O channel ready signal and interrupts the microcontroller 52 to signal the receipt of a new command. The command and associated data may be read from the interface command sequencer 412 via the internal data bus 444 and multiplexer 442. Once the microcontroller 52 has appropriately programmed the control registers in the interface command sequencer 412 and the buffer/sequencer, the host interface unit 50 is directed to reassert the I/O channel ready signal and allowed to begin processing the command.

Coordinating control signals are provided by way of control lines 474 to the asynchronous logic unit 456. In response, FIFO control signals are provided by way of the control lines 460 to a FIFO control unit 480. By way of the further FIFO control signals provided on control lines 482, the FIFO controller 480 manages the operation of the FIFO 418. Status information on the FIFO state is provided back to the asynchronous logic unit 456 by status lines 484. The asynchronous logic unit 454 further provides control signals on the control lines 462, 464 to the CRC generation unit 446 and a CRC control unit 468. The CRC control unit 468 is responsible for the detailed operation of the CRC generation unit 446 and, in addition, selecting either of the multiplexers 422, 424 to transfer the CRC value from the internal data buses 454, 466 to the buses 434 and 436 as necessary to append the CRC value to the end of a currently transferred data block. The CRC generation unit 446 and CRC control unit 464 provides status information back to the asynchronous logic unit 456 via the status lines 476. One such status signal is the match/fail status of a CRC value comparison operation. This control signal, in conjunction with others to control the specific operation of the multiplexer 414, latches 430, 432 and multiplexer 442 are provided on some of the control lines 466. Additionally, the asynchronous logic unit 456 generates and provides via the remaining control lines 466, the port A and port B request signals on lines 132, $78_2$ and the port A and port B byte count control signals on lines 136, $78_4$. Finally, the asynchronous logic unit 456 is responsible for generating and providing an interrupt signal onto one of the lines 466 to a microcontroller interrupt line $54_3$. This interrupt signal is used, as previously described, to alert the microcontroller 52 to the receipt of a command by the interface command sequencer 412, to signal the end of a block data transfer where, typically, a new Host Address PC address value is required for further data transfers, and upon failure of a CRC match operation, for example.

Figure 7B:
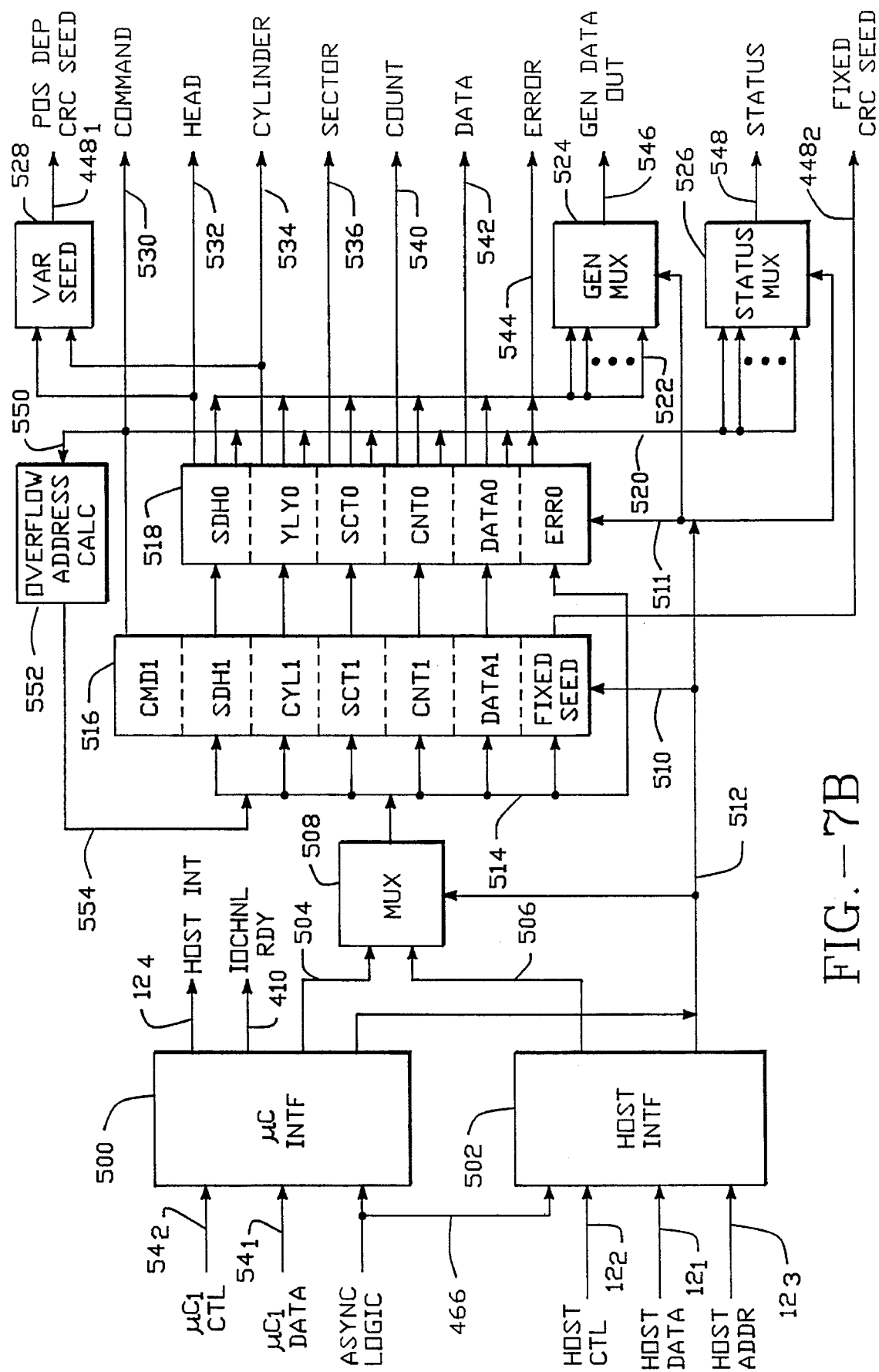

Referring now to FIG. 7B, a detailed portion of the interface command sequencer 412 is shown to illustrate the utilization of a double buffered, or staging set of shared configuration control registers. A microcontroller interface unit 500 receives the data and control portions $54_{1-2}$ of the host microcontroller data, address and control bus 54. The microcontroller interface unit 500 also receives an enable control signal from the asynchronous logic unit 456 via one of the control lines 466.

In parallel, a host interface unit 502 receives the host interface data control and address lines $12_{1-3}$ and an enable control signal from the asynchronous logic unit 456 via another one of the control lines 466. Data from microcontroller interface 500 and host interface unit 502 are passed via internal data buses 504, 506 to a multiplexer 508, operating as a demultiplexer/router for selectively delivering data from the input lines 504, 506 to any output line of a distribution bus 514. The function of the multiplexer is controlled by a select signal on one of the control lines 512 as driven in concert by the microcontroller interface unit 500 and host interface unit 502. Data from the multiplexer 508 is transferred via the distribution bus 514 to an array of data registers 516. These data registers provide for storage of single bytes defining a command (CMD1), head (SDH1), cylinder (CYL1), sector (SCT1), count (CNT), data (DATA1), and fixed value CRC seed. Thus, the function of the multiplexer 508 and control signals on lines 510 from the control bus 512 allow each of the registers within the register array 516 to be independently written with a selected byte value.

A second register array 518 essentially duplicates the head through count registers of the array 516. In addition, an error (ERR0) register is provided to hold a current error status value. All data from the host interface 12 or host microcontroller 52 is routed through the data registers, DATA1 and DATA0. These two registers operate together as a word (16 bit) to byte converter for transfers from the host interface 12.

Control signals provided on control lines 510, 511 provide for the high speed, parallel transfer of the head through count byte values from the array 516 to the array 518. Unlike the head through count registers of the array 516, the corresponding registers of the array 518, are used to directly control a current data block transfer operation. For purposes of the Host interface unit 50", the host interface 12 generally operates in a "physical" block addressing mode with sectors predefined as being 512 bytes in length. Thus, in the transfer of a data block consisting of some number of sectors stored in the count register, the data within each sector can be referenced as an offset count within a sector of a current cylinder accessed by a current head. Thus, as each sector of a data block is transferred through the host interface unit 50", the value stored in the sector register of the register array 518 is incremented and the count register value is decremented. Each time the sector number exceeds a predefined number of sectors per cylinder (typically 17), the sector value rolls ever to zero and the head value is incremented. Similarly, once the maximum head number has been exceeded, the cylinder number is incremented. The incrementing of the sector register value is performed in response to a control signal received on the control lines 511 from the microcontroller or host interface 500, 502.

The overflow of the sector number—when it exceeds the defined number of sectors per cylinder—is detected by an overflow address calculation unit 552. This overflow address calculation unit 552 monitors the current count, sector, cylinder and head register values via the lines 550. Whenever any one of the sector, cylinder and head register values reaches their predefined limit, a new combination of sector, cylinder and head register values is calculated and written into the corresponding registers of the register array 516. The current count value is also preserved by writing into its corresponding register in the register array 516. Thus, as soon as the current sector is transferred, the new combination of sector, cylinder and head values can be transferred in parallel to the register array 518, and the data block transfer can be continued without involving the host microprocessor 52 and introducing a corresponding substantial latency in completing the data block transfer.

The command register of the register array 518 does not change on a per sector basis. Rather, the command defines the operation being performed with respect to the data block being transferred.

The value stored in the command through data registers of the register array 518 are directly available to the control logic of the interface command sequencer 412 via the control lines 530, 532, 534, 536, 540, 542. In addition, the data value in the error register of the register array 516 and fixed seed CRC value are available on the control lines 544, $448_2$. Other than the fixed CRC seed value, these register values are used to select and progressively sequence the operation of the interface command sequencer 412.

A variable CRC generator 512 is provided to generate a CRC seed value that is directly dependant on the current head and cylinder register values. In the preferred embodiment of the present invention, a bit exclusive or of the head and cylinder values from control lines 532, 534 is performed by the variable seed unit 528. The resulting eight bit, position dependant CRC seed value is provided on line $448_1$. A multiplexer (not shown), controlled by a control signal from the microcontroller interface unit 500 selects whether the position dependant or fixed CRC seed value is provided onto the CRC seed line 448 from the interface command sequencer 412 to the CRC generation unit 446. Thus, not only is the validity of the data insured by the provision of a CRC for each data block transferred through the host interface unit 50", but an additional integrity check is made that the data, when subsequently read back from the disks 14, is from the intended head and cylinder.

Finally, both the host microcontroller 52 and a host coupled to the host interface 12 are permitted to read the current values of the head through data registers of the register array 518. A general data multiplexer 524 is coupled via the buses 522 to the head, cylinder, sector, count, data and error registers of the register array 518. Thus, any of these register values can be selected through the general data multiplexer 524 onto the internal data bus 546 for further routing through the interface command sequencer 412 to the host data bus $12_1$. Similarly, a status multiplexer 526 is connected to the full set of registers of the register array 518 and, in addition, to the command register of the register array 516. The values obtainable through the status multiplexer 526 are provided onto the internal data bus 548 to the data bus 444 for transfer of the selected data to the multiplexer 442.

Thus, a comprehensive, high-performance, flexible architecture for controlling one or more actuator assemblies in regard to a common set of disks has been described. Furthermore, a multi-tiered scheme for insuring data integrity both through the electronic control architecture as well as specifically the reading and writing of data to and from the surfaces of the disks has been described. The architecture is particularly notable for modularity and its use of an arbitration controller to manage access to a intermediate buffer memory within each actuator or controller that allows separate microcontrollers to operate fully at their respective tasks of managing the host interface and the low-level control of an actuator assembly.

Consequently, it is to be understood that may modifications and variations of the present invention are possible in light of the foregoing disclosure. It is therefore to be further understood that, within the scope of the appended claims, the invention may be practiced otherwise that is specifically described above.

We claim:

1. A controller within a hard disk drive for controlling the transfer of data and control signals between a plurality of host processors and said disk drive, said disk drive including storage media, at least one transducer for recording data on and retrieving data from said storage media and an actuator for moving said transducers with respect to said storage media, said controller comprising:

a programmed first microprocessor operating under control of a first operating system stored in a first memory unit associated with said first microprocessor for controlling the recording of data on said storage media and the retrieval of data from said storage media, the positioning of said actuator to locate said transducer at a specified location with respect, to said storage media and for maintaining the position of a said transducer at a specified location with respect to said storage media;

a programmed second microprocessor operating under control of a second operating system stored in a second memory unit associated with said second microprocessor for controlling the transfer of data from a requesting host processor of said plurality of host processors to said disk drive and the transfer of data recovered from said storage media to a requesting host processor of said plurality of host processor and for generating and communicating parameters to said first microprocessor for defining operations to be performed by said first microprocessor;

where said second microprocessor operates independently of and concurrently with said first microprocessor and said first microprocessor operates independently of and concurrently with said second microprocessor in exercising operations defined by said parameters received from said second microprocessor.

2. A controller in a hard disk drive system for controlling the transfer of data and control signals between a plurality of host processors and said disk drive system, said disk drive system including storage media, at least one transducer for recording data on and retrieving data from said storage media and an actuator for moving said transducers with respect to said storage media, said controller comprising:

a programmed first microprocessor operating under control of a first operating system stored in a first memory unit associated with said first microprocessor for controlling the recording of data on said storage media and the retrieval of data from said storage media, the positioning of said actuator to locate said transducer at a specified location with respect to said storage media and for maintaining the position of a said transducer at a specified location with respect to said storage media, wherein said first microprocessor further comprises:

error handling means for detecting and correcting error in data recovered from said storage media; and reporting means for reporting the error and the error location to said second microprocessor;

a programmed second microprocessor operating under control of a second operating system stored in a second memory unit associated with said second microprocessor for controlling the transfer of data from a requesting host processor of said plurality of host processors to said disk drive system and the transfer of data recovered from said storage media to a requesting host processor of said plurality of host processors and for generating and communicating parameters to said first microprocessor for defining operations to be performed by said first microprocessor wherein said second microprocessor further comprises;

error history means for performing statistical and historical error record keeping for error detected by said first microprocessor and said second microprocessor;

error correction means for recovering from errors detected by said first microprocessor that was not correctable by said first error processor; and error detection means for detecting an error in the transfer of data internal to said disk drive system other than an error detected in the recovered data from said storage media by said error handling means of said first microprocessor; and where said second microprocessor operates independently of and concurrently with said first microprocessor and said first microprocessor operates independently of and concurrently with said second microprocessor in exercising operations defined by said parameters received from said second microprocessor.

3. A controller in a hard disk drive system for controlling the transfer of data and control signals between a plurality of host processors and said disk drive system, said disk drive system including storage media, at least one transducer for recording data on and retrieving data from said storage media and an actuator for moving said transducers with respect to said storage media, said controller comprising:

a programmed first microprocessor operating under control of a first operating system stored in a first memory unit associated with said first microprocessor for controlling the recording of data on said storage media and the retrieval of data from said storage media, the positioning of said actuator to locate said transducer at a specified location with respect to said storage media and for maintaining the position of a said transducer at a specified location with respect to said storage media;

a programmed second microprocessor operating under control of a second operating system stored in a second memory unit associated with said second microprocessor for controlling the transfer of data from a requesting host processor of said plurality of host processors to said disk drive system and the transfer of data recovered from said storage media to a requesting host processor of said plurality of host processors and for generating and communicating parameters to said first microprocessor for defining operations to be performed by said first microprocessor wherein said second microprocessor further comprises;

task means for accumulating tasks for said disk drive system issued by said plurality of host processors;

sequence means for determining the order in which said tasks are to be performed by said disk drive system; and mapping means for address mapping the location of data in said storage media and in said buffer, for determining the availability of storage space on said storage media and said buffer and for allocating storage space on said storage media and said buffer for said task received by said disk drive system that required space on said storage media and in said buffer; and where said second microprocessor operates independently of and concurrently with said first microprocessor and said first microprocessor operates independently of and concurrently with said second microprocessor in exercising operations defined by said parameters received from said second microprocessor.

4. The controller of claim 3 further comprising:

a buffer for storing data;

said first microprocessor recovering data stored in said buffer by said second microprocessor for storage on said storage media and storing data in said buffer recovered from said storage media for transfer to a host processor requesting the data by said second microprocessor; and said second microprocessor recovering data stored in said buffer by said first microprocessor for transfer to a host processor requesting the data and storing data in said buffer received from said host for storage on said storage media by said first microprocessor.

5. The controller of claim 4 further comprising:

a buffer sequencer connected to said buffer for controlling access to said buffer for the simultaneous flow of data between said buffer and said host and between said buffer and said storage media.

6. The controller of claim 5 wherein said buffer sequencer comprises:

arbitrating means for arbitrating access to said buffer when a conflict arises between a request for access to said buffer issued by said first microprocessor and a request for access to said buffer issued by said second microprocessor.

7. A controller of claim 3 wherein said second microprocessor further comprises:

host means for controlling the communications between said disk drive system and said plurality of host processors wherein said disk drive system can be processing a request from one of said plurality of host processors while being in direct communication with another one of said plurality of host processors.

8. A controller in a hard disk drive system for controlling the transfer of data and control signals between a plurality of host processors and said disk drive system, said disk drive system including storage media, at least one transducer for recording data on and retrieving data from said storage media and an actuator for moving said transducers with respect to said storage media, said controller comprising:

a programmed first microprocessor operating under control of a first operating system stored in a first memory unit associated with said first microprocessor for controlling the recording of data on said storage media and the retrieval of data from said storage media, the positioning of said actuator to locate said transducer at a specified location with respect to said storage media and for maintaining the position of a said transducer at a specified location with respect to said storage media;

a programmed second microprocessor operating under control of a second operating system stored in a second memory unit associated with said second microprocessor for controlling the transfer of data from a requesting host processor of said plurality of host processors to said disk drive system and the transfer of data recovered from said storage media to a requesting host processor of said plurality of host processors and for generating and communicating parameters to said first microprocessor for defining operations to be performed by said first microprocessor wherein said second microprocessor further comprises;

translation means for converting a task received from a requesting host processor of said plurality of host processors into one or more commands for said first processor to carry out said task; and transfer means for transferring said one or more commands for said task to a third memory unit associated with said first microprocessor; and where said second microprocessor operates independently of and concurrently with said first microprocessor and said first microprocessor operates independently of and concurrently with said second microprocessor in exercising operations defined by said parameters received from said second microprocessor.

9. A controller of claim 8 wherein said second microprocessor further comprises:

host means for controlling the communications between said disk drive system and said plurality of host processors wherein said disk drive system can be processing a request from one of said plurality of host processors while being in direct communication with another one of said plurality of host processors.

10. A controller of claim 8 wherein said first microprocessor further comprises:

error handling means for detecting and correcting error in data recovered from said storage media; and reporting means for reporting the error and the error location to said second microprocessor.

11. The controller of claim 8 further comprising:

a buffer for storing data;

said first microprocessor recovering data stored in said buffer by said second microprocessor for storage on said storage media and storing data in said buffer recovered from said storage media for transfer to a host processor requesting the data by said second microprocessor; and said second microprocessor recovering data stored in said buffer by said first microprocessor for transfer to a host processor requesting the data and storing data in said buffer received from said host for storage on said storage media by said first microprocessor.

12. The controller of claim 11 further comprising:

a buffer sequencer connected to said buffer for controlling access to said buffer for the simultaneous flow of data between said buffer and said host and between said buffer and said storage media.

13. The controller of claim 12 wherein said buffer sequencer comprises:

arbitrating means for arbitrating access to said buffer when a conflict arises between a request for access to said buffer issued by said first microprocessor and a request for access to said buffer issued by said second microprocessor.

14. A controller in a hard disk drive system for controlling the transfer of data and control signals between a plurality of host processors and said disk drive system, said disk drive system including storage media, at least one transducer for recording data on and retrieving data from said storage media and an actuator for moving said transducers with respect to said storage media, said controller comprising:

a programmed first microprocessor operating under control of a first operating system stored in a first memory unit associated with said first microprocessor for controlling the recording of data on said storage media and the retrieval of data from said storage media, the positioning of said actuator to locate said transducer at a specified location with respect to said storage media and for maintaining the position of a said transducer at a specified location with respect to said storage media;

a programmed second microprocessor operating under control of a second operating system stored in a second memory unit associated with said second microprocessor for controlling the transfer of data from a requesting host processor of said plurality of host processors to said disk drive system and the transfer of data recovered from said storage media to a requesting host processor of said plurality of host processors and for generating and communicating parameters to said first microprocessor for defining operations to be performed by said first microprocessor wherein said second microprocessor further comprises;

task means for accumulating tasks for said disk drive system issued by said plurality of host processors;

sequence means for determining the order in which said tasks are to be performed by said disk drive system;

mapping means for address mapping the location of data in said storage media and in said buffer and for determining the availability of storage space on said storage media and said buffer;

host means for controlling the communications between said disk drive system and said plurality of host processors wherein said disk drive system can be processing a request from one of said plurality of host processors while being in direct communication with another one of said plurality of host processors;

translation means for converting a task received from a requesting host processor of said plurality of host processors into one or more commands for said first processor to carry out said task; and transfer means for transferring said one or more commands for said task to a third memory unit associated with said first microprocessor; and where said second microprocessor operates independently of and concurrently with said first microprocessor and said first microprocessor operates independently of and concurrently with said second microprocessor in exercising operations defined by said parameters received from said second microprocessor.

15. A controller of claim 14 wherein said first microprocessor further comprises:

error handling means for detecting and correcting error in data recovered from said storage media; and reporting means for reporting the error and the error location to said second microprocessor.

16. A controller of claim 15 wherein said second microprocessor further comprises:

error history means for performing statistical and historical error record keeping for error detected by said first microprocessor and said second microprocessor;

error correction means for recovering from errors detected by said first microprocessor that was not correctable by said first error processor; and error detection means for detecting an error in the transfer of data internal to said disk drive system other than an error detected in the recovered data from said storage media by said error handling means of said first microprocessor.

* * * * *

UNITED STATES PATENT AND TRADEMARK OFFICE
CERTIFICATE OF CORRECTION

PATENT NO. : 5,610,808
DATED : March 11, 1997
INVENTOR(S) : John P. Squires et al.

It is certified that error appears in the above-indentified patent and that said Letters Patent is hereby corrected as shown below:

```
Column 1,  line 59,  before "actuator" insert -- an --.
Column 1,  line 59,  after "with respect to" delete "a".
Column 2,  line 15,  "improved" should be -- improve --.
Column 2,  line 16,  "depending in" should be --depending on--.
Column 2,  line 43,  "tine" should be -- time --.
Column 3,  line 17,  "actuators" should be -- actuator --.
Column 3,  line 35,  after "purpose" delete -- of --.
Column 3,  line 53,  after "FIG. 3 is" insert -- a --.
Column 3,  line 58,  "details" should be -- detailed --.
Column 3,  line 65,  after "FIG. 7a is" insert -- a --.
Column 4,  line 37,  after "second" delete "a".
Column 6,  line 5,   "microcontrol let 80" should be
                     -- microcontroller 80 --.
Column 6,  line 21,  "preferable" should be -- preferably --.
Column 6,  line 24,  "circuit 30" should be -- circuit 90 --.
Column 6,  line 59,  "unit 18" should be -- unit 88 --.
Column 7,  line 31,  after "that is to" insert -- be --.
Column 8,  line 9,   "take" should be -- the --.
Column 8,  line 10,  "transferred" should be -- transfer --.
Column 10, line 21,  "bus 86," should be -- bus $86_1$ --.
Column 10, line 38,  "Crack" should be -- track --.
Column 11, line 8,   "take" should be -- the --.
Column 11, line 16,  after "172" insert a comma -- , --.
Column 11, line 47,  "1" should be -- Eq. 1 --.
Column 11, line 48,  "2" should be -- Eq. 2 --.
Column 12, line 64,  "take" should be -- the --.
Column 13, line 59,  "memory 58" should be -- memory 68 --.
Column 14, line 15,  "dissection" should be -- direction --.
Column 14, line 28,  after "bus" insert -- 54; --.
Column 14, line 34,  "until 202" should be -- unit 202 --.
Column 14, line 36,  after "lines" delete the semicolon ";".
Column 15, line 6,   "writtne" should be -- written --.
```

UNITED STATES PATENT AND TRADEMARK OFFICE
CERTIFICATE OF CORRECTION

PATENT NO. : 5,610,808
DATED : March 11, 1997
INVENTOR(S) : John P. Squires et al.

It is certified that error appears in the above-indentified patent and that said Letters Patent is hereby corrected as shown below:

```
Column 15, line 23, after "registers" insert --;--.
Column 15, line 43, sequences" should be --sequencer--.
Column 16, line 37, delete "sheet".
Column 17, line 38, "bluffer" should be --buffer--.
Column 17, line 46, "multipler" should be --multiplexer--.
Column 17, line 52, "buffet 68" should be --buffer 68--.
Column 17, line 58, "simple" should be --simply--.
Column 19, line 2,  "correct on" should be --correction--.
Column 20, line 38, "54" should be --54₁--.
Column 21, line 52, "394" should be --304--.
Column 23, line 35, "unit 268" should be --unit 368--.
Column 23, line 48, "synchro-" should be --asynchro- --.
Column 24, line 43, "take" should be --the--.
Column 25, line 15, "hall" should be --has--.
Column 25, line 45, after "microcontroller insert --52.--.
Column 27, line 17, "rolls ever" should be --rolls over--.
Column 28, line 31, "may" should be --many--.
Column 28, line 52, after "respect" delete the comma ",".
Column 28, line 62, "processor" should be --processors--.
Column 29, line 39, "error detected" should be --errors detected--.
Column 33, line 9, "error in" should be --errors in--.
```

UNITED STATES PATENT AND TRADEMARK OFFICE
CERTIFICATE OF CORRECTION

PATENT NO. : 5,610,808
DATED : March 11, 1997
INVENTOR(S) : John P. Squires et al.

It is certified that error appears in the above-indentified patent and that said Letters Patent is hereby corrected as shown below:

Column 34, line 2, "error detected" should be --errors detected--.

Signed and Sealed this

Fourteenth Day of September, 1999

*Attest:*

Q. TODD DICKINSON

*Attesting Officer*      *Acting Commissioner of Patents and Trademarks*